(12) United States Patent
Burt

(10) Patent No.: US 8,843,242 B2
(45) Date of Patent: Sep. 23, 2014

(54) SYSTEM AND METHOD FOR MINIMIZING CONSUMER IMPACT DURING DEMAND RESPONSES

(75) Inventor: Ashley Wayne Burt, Louisville, KY (US)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 12/948,135

(22) Filed: Nov. 17, 2010

(65) Prior Publication Data
US 2011/0114627 A1 May 19, 2011

Related U.S. Application Data

(63) Continuation-in-part of application No. 12/559,597, filed on Sep. 15, 2009.

(60) Provisional application No. 61/097,082, filed on Sep. 15, 2008.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02J 3/14* | (2006.01) |
| *F24C 7/08* | (2006.01) |

(52) U.S. Cl.
CPC . *F24C 7/087* (2013.01); *H02J 3/14* (2013.01); *Y04S 20/242* (2013.01); *Y02B 70/3266* (2013.01)
USPC .......... 700/295; 700/297; 700/299; 700/300; 700/291; 700/286; 307/38; 307/39

(58) Field of Classification Search
USPC ................. 700/295, 297, 299, 300, 291, 286; 307/38, 39
See application file for complete search history.

(56) References Cited

U.S. PATENT DOCUMENTS

| | | |
|---|---|---|
| 2,545,054 A | 3/1951 | Stitz |
| 3,683,343 A | 8/1972 | Feldman et al. |

(Continued)

FOREIGN PATENT DOCUMENTS

| | | |
|---|---|---|
| CN | 1692317 A | 11/2005 |
| CN | 101013979 A | 8/2007 |

(Continued)

OTHER PUBLICATIONS

Weisstein, Eric W. "At Least One.", From MathWorld—A Wolfram Web Resource. http://mathworld.wolfram.com/AtLeastOne.html, p. 1, May 3, 2013.

(Continued)

*Primary Examiner* — Kavita Padmanabhan
*Assistant Examiner* — Jason Lin
(74) *Attorney, Agent, or Firm* — Global Patent Operation; Marc A. Vivenzio

(57) ABSTRACT

An electromechanically controlled cooking appliance is provided. The cooking appliance includes one or more power consuming elements including at least one of a surface heating unit for surface cooking and an oven heating unit for heating a cooking cavity, at least one of an infinite switch and a thermostat, a control configured to receive and process a signal indicative of the current state of an associated utility including a peak demand state and an off-peak demand state and operate the cooking appliance in one of a plurality of operating modes, at least one of the power consuming elements operating at a lower power level when in the energy saving mode than in the normal operating mode, and a first element status sensor adapted to provide feedback to the control indicative of whether at least one of the one or more power consuming elements is in use, wherein at the conclusion of an energy savings mode, the controller is configured to use said feedback to determine when to restore the at least one or more power consuming elements to its normal mode power level.

20 Claims, 13 Drawing Sheets

(56) References Cited

U.S. PATENT DOCUMENTS

| | | |
|---|---|---|
| 3,720,073 A | 3/1973 | McCarty |
| 4,048,812 A | 9/1977 | Thomason |
| 4,167,786 A | 9/1979 | Miller et al. |
| 4,190,756 A | 2/1980 | Foerstner |
| 4,216,658 A | 8/1980 | Baker et al. |
| 4,247,786 A | 1/1981 | Hedges |
| 4,362,970 A | 12/1982 | Grady |
| 4,454,509 A | 6/1984 | Buennagel et al. |
| 4,637,219 A | 1/1987 | Grose |
| 4,659,943 A | 4/1987 | Virant |
| 4,718,403 A | 1/1988 | McCall |
| 4,731,547 A | 3/1988 | Alenduff et al. |
| 4,841,281 A | 6/1989 | Melvin, Jr. |
| 4,903,502 A | 2/1990 | Hanson et al. |
| 4,926,837 A | 5/1990 | Parker et al. |
| 4,998,024 A | 3/1991 | Kirk et al. |
| 5,040,724 A | 8/1991 | Brinkruff et al. |
| 5,137,041 A | 8/1992 | Hall |
| 5,183,998 A | 2/1993 | Hoffman et al. |
| 5,220,807 A | 6/1993 | Bourne et al. |
| 5,224,355 A | 7/1993 | So et al. |
| 5,230,467 A | 7/1993 | Kubsch et al. |
| 5,289,362 A | 2/1994 | Liebl et al. |
| 5,408,578 A | 4/1995 | Bolivar |
| 5,430,430 A | 7/1995 | Gilbert |
| 5,451,843 A | 9/1995 | Kahn et al. |
| 5,462,225 A | 10/1995 | Massara et al. |
| 5,479,157 A | 12/1995 | Suman et al. |
| 5,479,558 A | 12/1995 | White et al. |
| 5,481,140 A | 1/1996 | Maruyama et al. |
| 5,488,565 A | 1/1996 | Kennon et al. |
| 5,495,551 A | 2/1996 | Robinson et al. |
| 5,504,306 A | 4/1996 | Russell et al. |
| 5,505,377 A | 4/1996 | Weiss |
| 5,515,692 A | 5/1996 | Sterber et al. |
| 5,574,979 A | 11/1996 | West |
| 5,581,132 A | 12/1996 | Chadwick |
| 5,635,895 A | 6/1997 | Murr |
| 5,706,191 A | 1/1998 | Bassett et al. |
| 5,761,083 A | 6/1998 | Brown et al. |
| 5,805,856 A | 9/1998 | Hanson |
| 5,816,491 A | 10/1998 | Berkeley et al. |
| 5,866,880 A | 2/1999 | Seitz et al. |
| 5,874,902 A | 2/1999 | Heinrich et al. |
| 5,880,536 A | 3/1999 | Mardirossian |
| 5,883,802 A | 3/1999 | Harris |
| 5,886,647 A | 3/1999 | Badger et al. |
| 5,926,776 A | 7/1999 | Glorioso et al. |
| 5,937,942 A | 8/1999 | Bias et al. |
| 5,956,462 A | 9/1999 | Langford |
| 6,018,150 A | 1/2000 | Maher |
| 6,026,651 A | 2/2000 | Sandelman |
| 6,080,971 A | 6/2000 | Seitz |
| 6,118,099 A | 9/2000 | Lake |
| 6,179,213 B1 | 1/2001 | Gibino et al. |
| 6,185,483 B1 | 2/2001 | Drees |
| 6,229,433 B1 | 5/2001 | Rye et al. |
| 6,246,831 B1 | 6/2001 | Seitz et al. |
| 6,380,866 B1 | 4/2002 | Sizer et al. |
| 6,400,103 B1 | 6/2002 | Adamson |
| 6,480,753 B1 | 11/2002 | Calder et al. |
| 6,489,597 B1 | 12/2002 | Hornung |
| 6,553,595 B1 | 4/2003 | Bruntz et al. |
| 6,631,622 B1 | 10/2003 | Ghent et al. |
| 6,694,753 B1 | 2/2004 | Lanz et al. |
| 6,694,927 B1 | 2/2004 | Pouchak et al. |
| 6,704,401 B2 | 3/2004 | Piepho et al. |
| 6,778,868 B2 | 8/2004 | Imamura et al. |
| 6,784,872 B1 | 8/2004 | Matsui et al. |
| 6,806,446 B1 | 10/2004 | Neale |
| 6,817,195 B2 | 11/2004 | Rafalovich et al. |
| 6,828,695 B1 | 12/2004 | Hansen |
| 6,860,431 B2 | 3/2005 | Jayadev |
| 6,872,919 B2 | 3/2005 | Wakefield et al. |
| 6,873,876 B1 | 3/2005 | Aisa |
| 6,879,059 B2 | 4/2005 | Sleva |
| 6,904,385 B1 | 6/2005 | Budike |
| 6,922,598 B2 | 7/2005 | Lim et al. |
| 6,943,321 B2 | 9/2005 | Carbone et al. |
| 6,961,642 B2 | 11/2005 | Horst |
| 6,983,210 B2 | 1/2006 | Matsubayashi et al. |
| 7,010,363 B2 | 3/2006 | Donnelly et al. |
| 7,039,575 B2 | 5/2006 | Juneau |
| 7,043,380 B2 | 5/2006 | Rodenberg et al. |
| 7,053,790 B2 | 5/2006 | Jang et al. |
| 7,057,140 B2 | 6/2006 | Pittman |
| 7,069,090 B2 * | 6/2006 | Huffington et al. ............ 700/45 |
| 7,082,380 B2 | 7/2006 | Wiebe et al. |
| 7,110,832 B2 * | 9/2006 | Ghent ............................ 700/16 |
| 7,155,305 B2 | 12/2006 | Hayes et al. |
| 7,164,851 B2 | 1/2007 | Sturm et al. |
| 7,206,670 B2 | 4/2007 | Pimputkar et al. |
| 7,266,962 B2 | 9/2007 | Montuoro et al. |
| 7,274,973 B2 | 9/2007 | Nichols et al. |
| 7,274,975 B2 | 9/2007 | Miller et al. |
| 7,368,686 B2 | 5/2008 | Etheredge et al. |
| 7,372,002 B2 | 5/2008 | Nakamura et al. |
| 7,420,140 B2 | 9/2008 | Lenhart et al. |
| 7,420,293 B2 | 9/2008 | Donnelly et al. |
| 7,446,646 B2 | 11/2008 | Huomo |
| 7,478,070 B2 | 1/2009 | Fukui et al. |
| 7,541,941 B2 | 6/2009 | Bogolea et al. |
| 7,561,977 B2 | 7/2009 | Horst et al. |
| 7,565,813 B2 | 7/2009 | Pouchak |
| 7,685,849 B2 | 3/2010 | Worthington |
| 7,720,035 B2 | 5/2010 | Oh et al. |
| 7,751,339 B2 | 7/2010 | Melton et al. |
| 7,783,390 B2 | 8/2010 | Miller |
| 7,919,729 B2 | 4/2011 | Hsu |
| 7,925,388 B2 | 4/2011 | Ying |
| 7,962,248 B2 | 6/2011 | Flohr |
| 7,991,513 B2 | 8/2011 | Pitt |
| 8,024,073 B2 | 9/2011 | Imes et al. |
| 8,027,752 B2 | 9/2011 | Castaldo et al. |
| 8,033,686 B2 | 10/2011 | Recker et al. |
| 8,094,037 B2 | 1/2012 | Unger |
| 8,185,252 B2 | 5/2012 | Besore |
| 8,190,302 B2 | 5/2012 | Burt et al. |
| 8,355,748 B2 | 1/2013 | Abe et al. |
| 8,367,984 B2 | 2/2013 | Besore et al. |
| 2001/0025349 A1 | 9/2001 | Sharood et al. |
| 2001/0048361 A1 | 12/2001 | Mays et al. |
| 2002/0024332 A1 | 2/2002 | Gardner |
| 2002/0071689 A1 | 6/2002 | Miyamoto |
| 2002/0125246 A1 | 9/2002 | Cho et al. |
| 2002/0175806 A1 | 11/2002 | Marneweck et al. |
| 2002/0196124 A1 | 12/2002 | Howard et al. |
| 2002/0198629 A1 | 12/2002 | Ellis |
| 2003/0036820 A1 | 2/2003 | Yellepeddy et al. |
| 2003/0043845 A1 | 3/2003 | Lim et al. |
| 2003/0178894 A1 | 9/2003 | Ghent |
| 2003/0193405 A1 | 10/2003 | Hunt et al. |
| 2003/0194979 A1 | 10/2003 | Richards et al. |
| 2003/0233201 A1 * | 12/2003 | Horst et al. .................... 702/62 |
| 2004/0024483 A1 | 2/2004 | Holcombe |
| 2004/0034484 A1 | 2/2004 | Solomita et al. |
| 2004/0098171 A1 * | 5/2004 | Horst ............................ 700/295 |
| 2004/0100199 A1 | 5/2004 | Yang |
| 2004/0107510 A1 | 6/2004 | Buckroyd et al. |
| 2004/0112070 A1 | 6/2004 | Schanin |
| 2004/0117330 A1 | 6/2004 | Ehlers et al. |
| 2004/0118008 A1 | 6/2004 | Jeong et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0254654 A1 | 12/2004 | Donnelly et al. |
| 2005/0011205 A1 | 1/2005 | Holmes et al. |
| 2005/0134469 A1 | 6/2005 | Odorcic et al. |
| 2005/0138929 A1 | 6/2005 | Enis et al. |
| 2005/0173401 A1 | 8/2005 | Bakanowski et al. |
| 2005/0184046 A1 | 8/2005 | Sterling |
| 2005/0190074 A1 | 9/2005 | Cumeralto et al. |
| 2006/0031180 A1 | 2/2006 | Tamarkin et al. |
| 2006/0036338 A1 * | 2/2006 | Harkcom et al. ............... 700/83 |

(56) References Cited

U.S. PATENT DOCUMENTS

| | | |
|---|---|---|
| 2006/0068728 A1 | 3/2006 | Ishidoshiro et al. |
| 2006/0095164 A1 | 5/2006 | Donnelly et al. |
| 2006/0123807 A1 | 6/2006 | Sullivan et al. |
| 2006/0159043 A1 | 7/2006 | Delp et al. |
| 2006/0162973 A1 | 7/2006 | Harris et al. |
| 2006/0190139 A1 | 8/2006 | Reaume et al. |
| 2006/0208570 A1 | 9/2006 | Christian et al. |
| 2006/0259547 A1 | 11/2006 | Bogatin et al. |
| 2006/0272830 A1 | 12/2006 | Fima et al. |
| 2006/0276938 A1 | 12/2006 | Miller |
| 2006/0289436 A1 | 12/2006 | Carbone et al. |
| 2007/0005195 A1 | 1/2007 | Pasquale et al. |
| 2007/0008076 A1 | 1/2007 | Rodgers et al. |
| 2007/0030116 A1 | 2/2007 | Feher |
| 2007/0043478 A1 | 2/2007 | Ehlers et al. |
| 2007/0136217 A1 | 6/2007 | Johnson et al. |
| 2007/0151311 A1 | 7/2007 | McAllister et al. |
| 2007/0185675 A1 | 8/2007 | Papamichael et al. |
| 2007/0203860 A1 | 8/2007 | Golden et al. |
| 2007/0213880 A1 | 9/2007 | Ehlers |
| 2007/0220907 A1 | 9/2007 | Ehlers |
| 2007/0229236 A1 | 10/2007 | Mercer et al. |
| 2007/0271006 A1 | 11/2007 | Golden et al. |
| 2007/0276547 A1 | 11/2007 | Miller |
| 2008/0029081 A1 | 2/2008 | Gagas et al. |
| 2008/0034768 A1 | 2/2008 | Pimentel et al. |
| 2008/0083729 A1 | 4/2008 | Etheredge et al. |
| 2008/0106147 A1 | 5/2008 | Caggiano et al. |
| 2008/0120790 A1 | 5/2008 | Ashrafzadeh et al. |
| 2008/0122585 A1 | 5/2008 | Castaldo et al. |
| 2008/0136581 A1 | 6/2008 | Heilman et al. |
| 2008/0144550 A1 | 6/2008 | Makhlouf et al. |
| 2008/0167756 A1 | 7/2008 | Golden et al. |
| 2008/0167931 A1* | 7/2008 | Gerstemeier et al. ............. 705/8 |
| 2008/0172312 A1* | 7/2008 | Synesiou et al. ................ 705/34 |
| 2008/0177678 A1 | 7/2008 | Di Martini et al. |
| 2008/0179052 A1 | 7/2008 | Kates |
| 2008/0204240 A1 | 8/2008 | Hilgers et al. |
| 2008/0215263 A1* | 9/2008 | Flohr ............................ 702/62 |
| 2008/0258633 A1 | 10/2008 | Voysey |
| 2008/0272934 A1 | 11/2008 | Wang et al. |
| 2008/0277487 A1* | 11/2008 | Mueller et al. ............. 236/46 A |
| 2009/0006878 A1 | 1/2009 | Borghetti et al. |
| 2009/0038369 A1 | 2/2009 | Vondras |
| 2009/0063257 A1 | 3/2009 | Zak et al. |
| 2009/0105888 A1 | 4/2009 | Flohr et al. |
| 2009/0146838 A1 | 6/2009 | Katz |
| 2009/0171862 A1* | 7/2009 | Harrod et al. ................. 705/412 |
| 2009/0235675 A1 | 9/2009 | Chang et al. |
| 2009/0240381 A1 | 9/2009 | Lane |
| 2009/0254396 A1 | 10/2009 | Metcalfe |
| 2009/0326728 A1* | 12/2009 | Chrisop et al. ................ 700/295 |
| 2010/0017242 A1* | 1/2010 | Hamilton et al. ................ 705/8 |
| 2010/0070091 A1 | 3/2010 | Watson et al. |
| 2010/0092625 A1 | 4/2010 | Finch et al. |
| 2010/0131117 A1 | 5/2010 | Mattiocco et al. |
| 2010/0175719 A1 | 7/2010 | Finch et al. |
| 2010/0179708 A1 | 7/2010 | Watson et al. |
| 2010/0262963 A1 | 10/2010 | Wassermann et al. |
| 2010/0301774 A1 | 12/2010 | Chemel et al. |
| 2011/0001438 A1 | 1/2011 | Chemel et al. |
| 2011/0062142 A1 | 3/2011 | Steurer |
| 2011/0085287 A1 | 4/2011 | Ebrom et al. |
| 2011/0087382 A1 | 4/2011 | Santacatterina et al. |
| 2011/0095017 A1 | 4/2011 | Steurer |
| 2011/0106328 A1 | 5/2011 | Zhou et al. |
| 2011/0114627 A1 | 5/2011 | Burt |
| 2011/0123179 A1 | 5/2011 | Roetker et al. |
| 2011/0148390 A1 | 6/2011 | Burt et al. |
| 2011/0153106 A1 | 6/2011 | Drake et al. |
| 2011/0181114 A1 | 7/2011 | Hodges et al. |
| 2011/0290781 A1 | 12/2011 | Burt et al. |
| 2012/0054123 A1 | 3/2012 | Broniak et al. |

FOREIGN PATENT DOCUMENTS

| | | |
|---|---|---|
| EP | 1496324 A1 | 1/2005 |
| GB | 2105127 A | 3/1983 |
| JP | 11313441 A2 | 11/1999 |
| KR | 20060085711 A | 7/2006 |
| WO | 86/00976 A1 | 2/1986 |
| WO | 90/12261 A1 | 10/1990 |
| WO | 98/48335 A1 | 10/1998 |
| WO | 2007/060059 A1 | 5/2007 |
| WO | 2007136456 A2 | 11/2007 |

OTHER PUBLICATIONS

International Search Report from PCT Application No. PCT/US2009/056878, Nov. 17, 2009.
International Search Report from PCT Application No. PCT/US2009/056882, Nov. 4, 2009.
International Search Report from PCT Application No. PCT/US2009/056883, Oct. 26, 2009.
International Search Report from PCT Application No. PCT/US2009/056886, Nov. 5, 2009.
International Search Report from PCT Application No. PCT/US2009/056889, Nov. 10, 2009.
International Search Report from PCT Application No. PCT/US2009/056894, Nov. 13, 2009.
International Search Report from PCT Application No. PCT/US2009/056895, Nov. 9, 2009.
International Search Report from PCT Application No. PCT/US2009/056911, Mar. 10, 2010.
International Search Report from PCT Application No. PCT/US2009/056906, Nov. 10, 2009.
International Search Report from PCT Application No. PCT/US2009/056913, Nov. 10, 2009.
International Search Report from PCT Application No. PCT/US2009/056914, Nov. 2, 2009.
International Search Report from PCT Application No. PCT/US2009/056919, Nov. 2, 2009.
International Search Report from PCT Application No. PCT/US2009/056901, Nov. 10, 2009.
Search Report from EP Application No. 10153695.1, May 24, 2012.
Real-Time Feedback, Natural Resources Canada via website www.nrcan.gc.ca , 2008, http://oee.nrcan.gc.ca/publications/equipment/10918.
Lemay et al., An Integrated Architecture for Demand Response Communications and Control, University of Illinois Urbana-Champaign, Oct. 28, 2008.
Search Report from CN Application No. 201010135268.8 dated Oct. 24, 2012.

* cited by examiner

| | | RANGE CONTROL RESPONSE | | | MATCH TO FIG.5B |
|---|---|---|---|---|---|
| | | | | LOW | |
| RANGE CONTROL RESPONSE | PRIOR TO OPERATION | FACTORY SETTINGS MODE | | | |
| | DURING OPERATION | FACTORY SETTINGS MODE | | | |
| | | IF IN SELF-CLEAN, FINISH THE CYCLE | | | |
| | | MAX COOKING SETTING=HI | | | |
| RANGE UI RESPONSE (DSM DISABLED) | PRIOR TO OPERATION | DISPLAY NOTHING | | | |
| | | DISPLAY NOTHING | | | |
| RANGE UI RESPONSE (DSM ENABLED) | DURING OPERATION | DISPLAY NOTHING | | | |
| | | DISPLAY NOTHING | | | |

| MEDIUM | HIGH | CRITICAL |
|---|---|---|
| FACTORY SETTINGS MODE | FACTORY SETTINGS MODE | FACTORY SETTINGS MODE |
| FACTORY SETTINGS MODE | IF IN BAKE, BROIL OR PREHEAT CYCLE DURING THIS RATE, GO TO POWER SHARING MODE | IF IN BAKE, BROIL OR PREHEAT CYCLE DURING THIS RATE, GO TO POWER SHARING MODE |
|  | PROHIBIT THE START OF SELF-CLEAN | PROHIBIT THE START OF SELF-CLEAN |
|  | PROHIBIT THE START OF ANY COOKING FUNCTION IN THE LOWER OVEN | PROHIBIT THE START OF ANY COOKING FUNCTION IN THE LOWER OVEN |
| IF IN SELF-CLEAN, FINISH THE CYCLE | IF IN SELF-CLEAN, FINISH THE CYCLE | IF IN SELF-CLEAN, FINISH THE CYCLE |
| MAX COOKING SETTING=HI | MAX COOKING SETTING=8 | MAX COOKING SETTING=8 |
|  | ONLY RIGHT FRONT BURNER ALLOWED TO BE TURNED ON | ONLY RIGHT FRONT BURNER ALLOWED TO BE TURNED ON |
| DISPLAY NOTHING | DISPLAY NOTHING | DISPLAY NOTHING |
| DISPLAY NOTHING | DISPLAY NOTHING | DISPLAY NOTHING |
| DISPLAY NOTHING | DISPLAY NOTHING | DISPLAY NOTHING |
|  | DISPLAY "ECO" LED | DISPLAY "ECO" LED |
| DISPLAY NOTHING | FLASH "ECO" IN OVEN TEMPERATURE DIGITS AND GIVE ERROR BEEP IF UNALLOWED MODE IS ATTEMPTED | FLASH "ECO" IN OVEN TEMPERATURE DIGITS AND GIVE ERROR BEEP IF UNALLOWED MODE IS ATTEMPTED |

SYSTEM AND METHOD FOR MINIMIZING CONSUMER IMPACT DURING DEMAND RESPONSES

CROSS REFERENCE TO RELATED APPLICATIONS

The present application is a continuation-in-part of U.S. application Ser. No. 12/559,597, filed Sep. 15, 2009, which claims priority from U.S. Provisional Patent Application Ser. No. 61/097,082 filed 15 Sep. 2008; both of which are expressly incorporated herein by reference, in their entireties.

BACKGROUND OF THE DISCLOSURE

This disclosure relates to energy management, and more particularly to energy management of household consumer appliances. The disclosure finds particular application to cooking appliances and is particularly advantageously applied to such appliances with electromechanically controlled oven heating elements.

Currently, utilities charge a flat rate, but with the increasing cost of fuel prices and high energy usage at certain parts of the day, utilities have to buy more energy to supply customers during peak demand. Utility companies have to find ways to temporarily provide for this higher energy use, which comes at great expense to utility companies. Consequently, utilities are charging higher rates during peak demand periods. If the utility company can communicate that power is in high demand, home appliances, such as ranges that are typically used during peak time (later afternoon), could notify the consumer that demand is high and reduce peak power usage of the appliance and allow the utility company to shed load. This "demand response" capability in cooking appliances spread over thousands of customers would allow the utility company to shed a significant amount of peak load.

One proposed third party solution is to provide a system where a controller "switches" the actual energy supply to the appliance or control unit on and off. However, there is no active control beyond the mere on/off switching.

In cooking appliances such as electric ranges, which employ surface heating units comprising resistive heating elements for surface cooking and ovens comprising resistive bake and broil units for baking and broiling respectively, the surface units are used 2-3 times more often than the oven units. The best opportunity to shed power on surface units with minimum disruption to the user is during times when a surface heating unit is being operated at high settings. High settings are typically initiated to perform non-direct-cooking related activities, such as boiling water. For normal cooking using surface units, the user typically selects power settings which are 30% or less of max power, while when bringing water to a boil the user typically selects the maximum 100% power setting.

While electronic controls for surface units can change or limit the duty cycles in response to a "high demand", many ranges use electromechanical power switching devices such as infinite switches for surface heating units. These devices operate independently and need not interact with a microprocessor. This system provides a way to reduce peak and average power consumption of the electromechanically controlled surface heating units with minimal changes to conventional electromechanically controlled cooking appliance design, in a cost effective manner. This system is able to react to either a discrete normal demand or higher demand signal. Therefore, this system is a simple, low cost method to selectively reduce both peak and average power that does not require relatively expensive fully electronic range controls.

One method of providing low-cost reduction of peak and average power is to implement a simple demand side management "DSM" control device in an existing electromechanical appliance that will delay, adjust, or disable power consuming features to reduce power consumption. However, such a DSM device will simply switch off or reduce loads. Therefore, there exists a need for an additional feature to provide feedback regarding loads currently in use, which would enable the control to determine whether to deactivate, reduce, or maintain the current power load.

BRIEF DESCRIPTION OF THE DISCLOSURE

According to one aspect of the present disclosure, an electromechanically controlled cooking appliance is provided. The electromechanically controlled cooking appliance includes one or more power consuming devices including at least one of a surface heating unit for surface cooking and an oven heating element for heating a cooking cavity, at least one of an infinite switch and a thermostat for controlling the energization of a surface heating unit and an oven heating element respectively, and a control configured to receive and process a signal indicative of the current state of an associated utility including a peak demand state and an off-peak demand state and operate the cooking appliance in one of a plurality of operating modes, including at least a normal operating mode and an energy savings mode, in response to the received signal. At least one of said power consuming devices operating at a lower power level when in the energizing saving mode than in the normal operating mode. The cooking appliance further includes an element status sensor adapted to provide feedback to the control indicative of whether at least one of the one or more power consuming devices is in use. At the conclusion of an energy savings mode, the controller is configured to use the feedback to determine when to restore the at least one or more power consuming devices to its normal mode power level.

According to another aspect of the present disclosure, a method for reducing the peak power usage of an electromechanically controlled cooking appliance is provided including one or more heating elements, including at least one of a surface heating unit for surface cooking and an oven heating unit for heating a cooking cavity, at least one of an infinite switch and a thermostat for controlling the energization of a surface heating unit and an oven heating element respectively, a control configured to receive and process a signal indicative of the current state of an associated utility, the utility state being indicative of one of a peak demand period and an off-peak demand period, and a first element status sensor. The method comprises the steps of a) receiving and processing by the control a signal indicative of a peak demand period, b) receiving and processing by the control feedback from the first element status sensor indicating whether the one or more heating elements are currently in use, c) selectively entering energy savings mode for the one or more heating elements, d) receiving and processing a signal by the control indicating the conclusion of a peak demand period, e) receiving feedback from the first element status sensor indicating whether the one or more heating elements remain in use, and f) maintaining energy savings mode if the feedback indicates one or more heating elements are in use.

According to yet another aspect of the present disclosure, a system for reducing the peak power consumption of an electromechanically controlled cooking appliance is provided comprising at least one power consuming element. The system includes at least one of an infinite switch and a thermostat configured to control the delivery of power to at least one power consuming element, a control configured to receive and process a signal indicative of the current state of an associated utility, the state being indicative of one of a peak demand period and an off-peak demand period, the control adapted to operate the cooking appliance in one of a normal operating mode and an energy saving mode, in response to the received signal, a first element status sensor configured to provide feedback to the control indicative of whether at least one of the one or more power consuming elements is in use, and a second element status sensor configured to provide feedback to the control indicative of whether a predetermined threshold setting has been achieved. Upon receiving a signal indicative of a peak demand period, the control is configured to determine whether to operate in energy savings mode based on the feedback from the second element status sensor, and whether to return to normal operating mode based on feedback from the first element status sensor.

Still other features and benefits of the present disclosure will become apparent from reading and understanding the following detailed description.

BRIEF DESCRIPTION OF THE DRAWINGS

FIGS. 5(a) and (b) illustrate an exemplary programmed control response for the cooking appliance of FIG. 2.

DETAILED DESCRIPTION OF THE PREFERRED EMBODIMENTS

Figure 1:
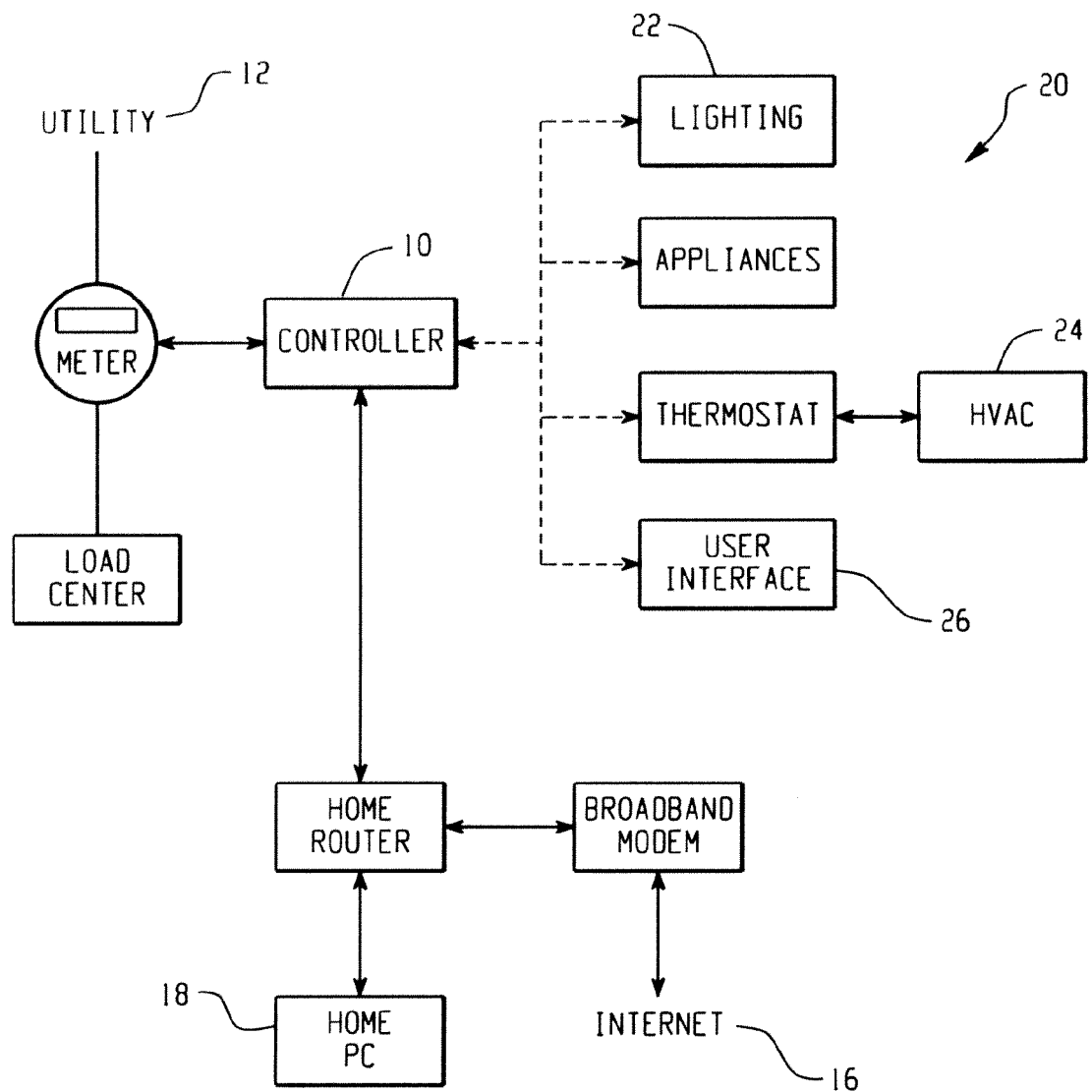
FIG. 1 illustrates an exemplary embodiment of an energy management system for household appliances.

FIG. 1 is a system diagram of home energy management system for a home which provides for communication between the utility providing energy to the home and the homeowner's appliances and other power consuming devices. The illustrative system of FIG. 1 includes a controller 10 which may be referred to as a demand side management module, communicatively linked to the utility 12 via a communicating or smart utility meter 14, or via the interne 16 through a home pc 18, and further communicatively linked, to a network of intelligent appliances 20, including a cooking appliance, lighting devices 22, HVAC system 24 and a user interface device 26. Less complex systems may eliminate the DSM and enable the appliances to communicate directly with the utility meter. The utility typically would employ in its computer system a demand server that in its simplest form notifies the appliance controller or the appliances directly, via the utility meter that the utility is operating in either a peak demand state or a normal state or off peak state.

Figure 2:
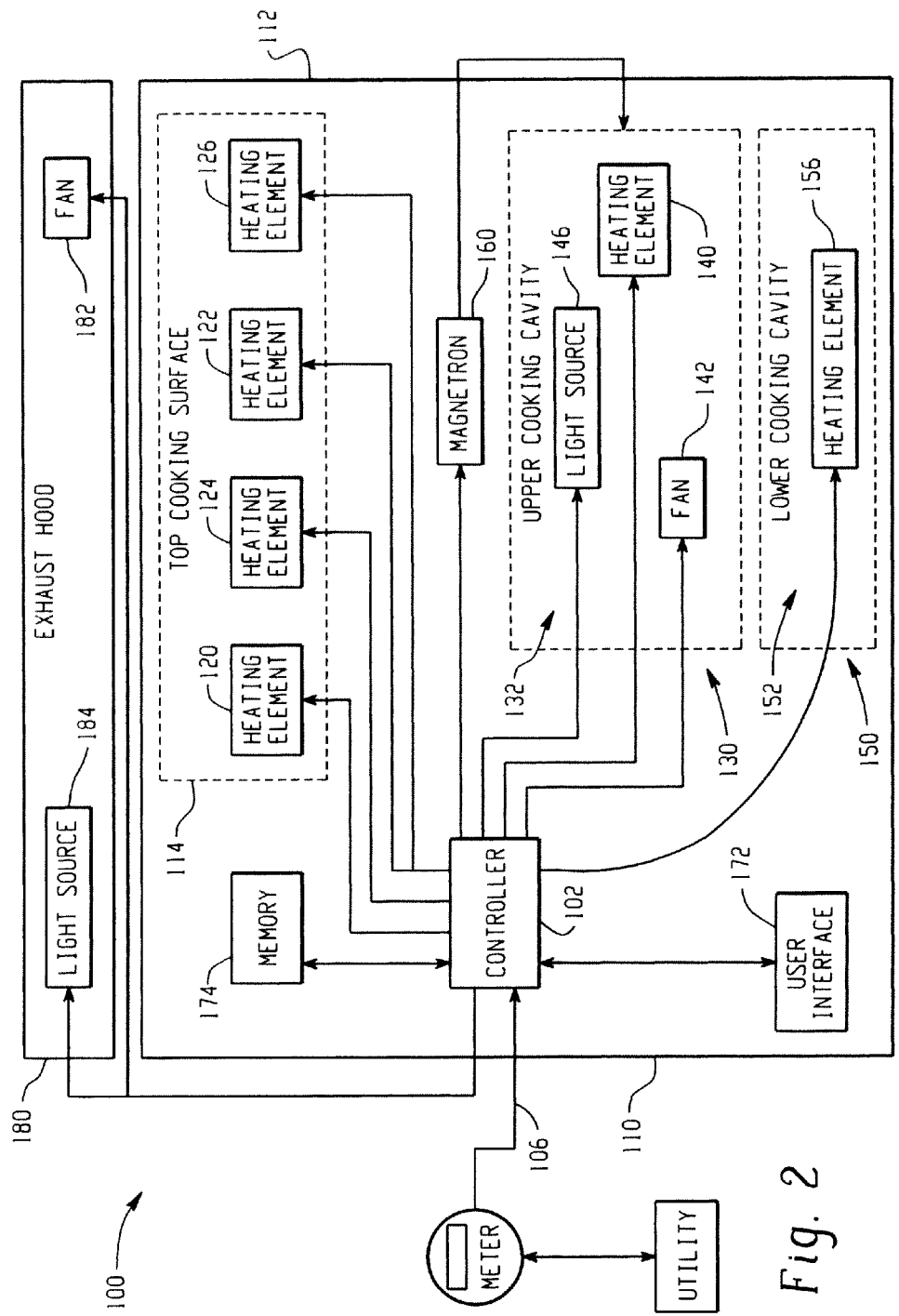
FIG. 2 is a schematic illustration of an exemplary demand managed electronically controlled cooking appliance.

A demand managed electronically controlled cooking appliance 100 is schematically illustrated in FIG. 2. The cooking appliance 100 comprises one or more power consuming features/functions and a controller 102 operatively connected to each of the power consuming features/functions. The controller 102 can include a micro computer on a printed circuit board which is programmed to selectively control the energization of the power consuming features/functions. The controller 102 is configured to receive and process a signal 106 indicative of a utility state, for example, availability, peak or off peak and/or current cost of supplied energy. Signal 106 may be received from the DSM, or from the smart utility meter. The energy signal may be provided to the smart meter by a utility provider, such as a power company, and can be transmitted via a power line, as a radio frequency signal, or by any other means for transmitting a signal when the utility provider desires to reduce demand for its resources. The cost can be indicative of the state of the demand for the utility's energy, for example a relatively high price or cost of supplied energy is typically associated with a peak demand state or period and a relative low price or cost is typically associated with an off-peak demand state or period.

The controller 102 can operate the cooking appliance 100 in one of a plurality of operating modes, including a normal operating mode and an energy savings mode, in response to the received signal. Specifically, the cooking appliance 100 can be operated in the normal mode in response to a signal indicating an off-peak demand state or period and can be operated in an energy savings mode in response to a signal indicating a peak demand state or period. As will be discussed in greater detail below, the controller 102 is configured to at least one of selectively delay, adjust and disable at least one of the one or more power consuming features/functions to reduce power consumption of the cooking appliance 100 in the energy savings mode.

As shown in FIG. 2, the cooking appliance 100 is in the form of a free standing range 110 having a top cooking surface 114. Although, it should be appreciated that the cooking appliance 100 can be any suitable cooking appliance including, without limitation, counter top cooking appliances, built-in cooking appliances and multiple fuel cooking appliances. Therefore, the range 110 is provided by way of illustration rather than limitation, and accordingly there is no intention to limit application of the present disclosure to any particular cooking appliance.

The depicted exemplary range 110 includes an outer body or cabinet 112 with the top cooking surface 114 having at least one individual surface heating element. In the depicted embodiment, the top cooking surface 114 includes four individual surface heating elements, namely, a left front heating element 120, a right front heating element 122, a left rear heating element 124, and a right rear heating element 126. It should be apparent to those skilled in the art that top cooking surface 114 may include any suitable number of heating elements, any suitable type of heating elements (i.e., single, double or triple element which operates in different modes) and/or any suitable arrangement of the heating elements.

The exemplary range 110 includes an oven 130 positioned within the cabinet 112 and below cooking surface 114. The oven 130 defines a cooking chamber or cavity 132, which has a maximum setpoint temperature in the normal operating mode. A drop door (not shown) sealingly closes a front opening of the oven during a cooking process. A door latch is configured to lock the door in a closed position during the cooking process and/or during a self-cleaning operation. The cooking cavity 132 is configured to receive and support a food item during the cooking process. The cooking cavity can be provided with at least one heating element 140. For example, the cooking cavity can be provided with an upper heating element, such as a broil heating element, and a lower heating element, such as a bake heating element. The cooking cavity 132 can also be provided with a convection fan 142 operatively associated with the cooking cavity for circulating heated air within the cooking cavity and a light source 146 for illuminating the cooking cavity.

Range 110 can include more than one cooking chamber or cavity. For example, the exemplary range 110 can includes a second oven 150 having a second cooking chamber or cavity 152. The second cooking cavity may be configured substantially similar to first cooking cavity 132 or may be configured differently. Additionally, the second cooking cavity 152 may be substantially similar in size to first cooking cavity 132 or may be larger or smaller than first cooking cavity 132. A drop door (not shown) sealingly closes a front opening of the second cooking chamber during the cooking process. Further, the second cooking chamber 152 is equipped with one or more suitable heating elements 156, such as a heating element and a lower heating element, as described above in reference to the cooking cavity 132.

Range 110 can further comprise an RF generation module including a magnetron 160 located on a side or top of the cooking cavity 132. The magnetron can be mounted to a magnetron mount on a surface of the cooking cavity. The magnetron is configured to deliver microwave energy into the cooking cavity 132. A range backsplash (not shown) can extend upward of a rear edge of top cooking surface 114 and can include, for example, a user interface 172, a control display and control selectors for user manipulation for facilitating selecting operative oven features, cooking timers, time and/or temperature displays. An exhaust hood 180 can be provided above the range 110. The exhaust hood can be operatively connected to the controller 102 and can include an exhaust fan 182 and a light source 184 for illuminating the top cooking surface 114.

In the normal operating mode, for use of the oven 130, a user generally inputs a desired temperature and time at which the food item placed in the cooking cavity 132 is to be cooked through at least one input selector. The controller 102 then initiates the cooking cycle. In one exemplary embodiment, the controller 102 is configured to cyclically energize and de-energize the heating element 140 and, if provided, in some cooking cycles, the magnetron 160 to heat the air and radiate energy directly to the food item. The duty cycle for the heating element 140 and magnetron 160, that is, the percent on time for the heating element and magnetron in a control time period, can depend on at least one of a pre-programmed cooking algorithm and a user selected operation mode. The length of time each component is on during a particular control period varies depending on the power level selected. The duty cycle, or ratio of the on time, can be precisely controlled and is pre-determined by the operating parameters selected by the user. Different foods will cook best with different ratios. The oven 130 allows control of these power levels through both pre-programmed cooking algorithms and through user-customizable manual cooking. Energization of the heating element 140 during pre-heat depends on the target temperature corresponding to the cooking temperature selected by a user and the temperature of the cooking cavity 132 upon initiation of the oven 130.

In the normal operating mode, the heating element 140 can have associated with it, a steady state reference temperature. If a target temperature is below the steady state reference temperature, the controller 102 is configured to energize the heating element 140 at 100% duty cycle to the target temperature and then cyclically energize the heating element 140 at the target temperature for the remainder a programmed cooking time.

In order to prevent overheating of the oven 130, the controller 102 can adjusts the power level of the heating element 140 and, if provided, the magnetron 160 to a first power level after a first period of time, and if the first power level is above a threshold power level for the heating element and magnetron, the controller adjusts the first power level to a second lower power level after a second period of time. By way of example, the heating element 140 can be energized to any combination of power levels (e.g., from 0 (not energized) to 10 (energized at 100%)). To prevent overheating, if the heating element 140 is energized at power level ten (10), after a first period of time, for example 10 minutes, the heating element 140 is reduced to 70% of the set power level. If the reduced power level is still higher than the threshold power level, after a second period of time, for example 20 minutes, the heating element 140 is reduced to 50% of the set power level.

Similarly, in using the one of the heating elements 120, 122, 124, 126 of the top cooking surface 114, a user sets the temperature of the heating element through a control selector. Each individual surface heating element has a maximum setpoint temperature in the normal operating mode. The controller 102 controls the temperature of the surface heating element 120, 122, 124, 126 by, for example, duty cycling the heating element.

If the controller 102 receives and processes an energy signal indicative of a peak demand period at any time during operation of the appliance 100, the controller makes a determination of whether one or more of the power consuming features/functions should be operated in the energy savings mode and if so, it signals the appropriate features/functions of the appliance 100 to begin operating in the energy savings mode in order to reduce the instantaneous amount of energy being consumed by the appliance. The controller 102 determines what features/functions should be operated at a lower consumption level and what that lower consumption level should be, rather than an uncontrolled immediate termination of the operation of specific features/functions.

In order to reduce the peak energy consumed by the cooking appliance 100, the controller 102 is configured to at least one of selectively delay, adjust and disable at least one of the one or more above described power consuming features/functions to reduce power consumption of the cooking appliance 100 in the energy savings mode. Reducing total energy consumed also encompasses reducing the energy consumed at peak times and/or reducing the overall electricity demands. Electricity demands can be defined as average watts over a short period of time, typically 5-60 minutes. Off peak demand periods correspond to periods during which lower cost energy is being supplied by the utility relative to peak demand periods. Operational adjustments that result in functional energy savings will be described in detail hereinafter.

The cooking cavity 132 has a maximum setpoint temperature in the normal operating mode. To reduce the power consumption of the oven 130 in the energy savings mode, the controller 102 is configured to reduce the setpoint temperature in the energy savings mode. To this extent, the power of the heating element 140 of the cooking cavity 132 can be reduced by selectively adjusting the duty cycle of the heating element throughout a selected cooking cycle. The controller can disable or reduce the speed of the convection fan 142 and can disable or reduce the intensity of the light source 146.

If the range 110 includes the magnetron 160, in some instances, the frequency of the energy signal can be impacted by the fundamental frequency of the magnetron 160. A typical microwave oven uses between 500 and 1000 W of microwave energy at 2.45 GHz to heat the food. There may be a high likelihood that the frequency bands of microwave signals generated by the magnetron create interference with frequency bands used for Wibro communication, HSDPA (High Speed Downlink Packet Access), wireless LAN (Local Area Network. IEEE 802.22 standards), Zigbee (IEEE802.15 standards), Bluetooth (IEEE802.15 standards) and RFID (Radio Frequency Identification). If the controller 102 determines that the frequency of the incoming energy signal 106 is generally harmonic with the frequency of the activated magnetron (i.e., the energy signal is impacted or degraded by the magnetron frequency), the controller can at least temporarily block communication with the energy signal to prevent unreliable communications during operation of the magnetron. Alternatively, the controller 102 can temporarily block communication during activation of the magnetron 160 regardless of the frequency if the energy signal 106. The energy signal can be queued in a memory 174. After deactivation of the magnetron, the controller can review and process the queued energy signal stored in the memory to at least partially determine the operating mode for the appliance 100. If the appliance is to operate in the energy savings mode, the power level of the magnetron can be selectively adjusted to reduce the power consumed by the magnetron during subsequent operation.

During the energy savings mode, a pre-heat ramp rate is reduced to reduce demand. The controller 102 can also selectively disable the self clean feature in the energy savings mode. However, if the self clean feature was activated in the normal operating mode and the controller determines based on the cost of supplied energy that the cooking appliance 100 should operate in the energy savings mode, in the illustrative embodiment, the controller 102 will finish the self clean cycle in the energy savings mode. Alternatively, the controller could be configured to immediately interrupt the self-clean mode upon determining the appliance should operate in the energy savings mode and repeat the self-clean cycle after the energy signal signifies an off-peak period or the controller otherwise determines operation in the energy savings mode is no longer desired. As indicated above, the range 110 can include the second oven 150 having the second cooking cavity 152. With this setup, the controller 102 is configured to disable one of the cooking cavities 132, 152, particularly the second cooking cavity, in the energy savings mode.

Regarding the top cooking surface 114, each individual surface heating element 120, 122, 124, 126 has a maximum setpoint temperature in the normal operating mode. To reduce power of the top cooking surface 114, the controller 102 can limit the number of surface heating elements that can be energized and is configured to reduce the setpoint temperature of at least one activated temperature controlled surface heating element in the energy savings mode. The controller can also reduce power of an activated open loop surface heating element by selectively adjusting the duty cycle of the activated heating element. Further, in the energy savings mode, at least one surface heating element 120, 122, 124, 126 can be at least partially disabled.

To further reduce the power consumption of the appliance 100 in the energy savings mode, the controller 102 is configured to disable or reduce the speed of the exhaust fan 182 of the exhaust hood 180. The light source 184 can also be disabled or the intensity of the light source can be reduced.

The determination of which power consuming features/functions are operated in an energy savings mode may depend on whether the appliance 100 is currently operating. In one embodiment, the controller 102 includes functionality to determine whether activation of the energy savings mode for any power consuming features/functions would potentially cause damage to any feature/function of the appliance 100 itself or would cause the appliance to fail to perform its intended function, such as a complete cooking of food in the cooking cavity 132 of the oven 130. If the controller determines that an unacceptable consequence may occur by performing an energy saving action, such as deactivating or curtailing the operation of a power consuming feature/function in the appliance 100, the controller may opt-out of performing that specific energy saving action or may institute or extend other procedures. For example, the controller 102 may determine that the deactivation or limitation of the operation of the convection fan 142 may result in overheating of the heating element 140 which has not yet been deactivated or limited. As a result, the controller prevents the appliance from being damaged.

Figure 3:
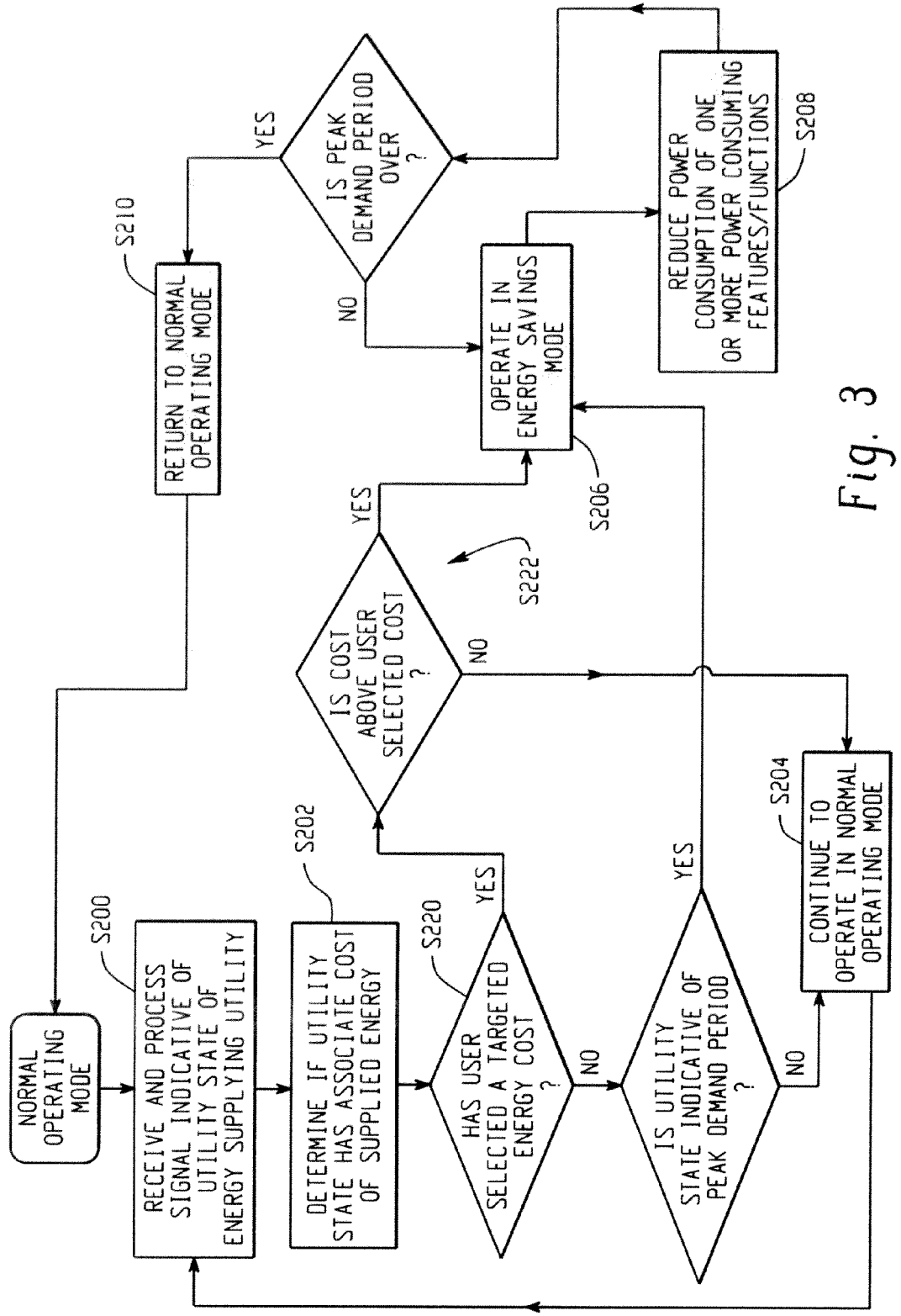
FIGS. 3 and 4 are exemplary operational flow charts for the cooking appliance of FIG. 2.

With reference to FIG. 3, a control method for the cooking appliance 100 in accordance with the present disclosure comprises receiving and processing the signal indicative of cost of supplied energy (S200), determining a state for an associated energy supplying utility, such as a cost of supplying energy from the associated utility (S202), the utility state being indicative of at least a peak demand period or an off-peak demand period, operating the appliance 100 in a normal mode during the off-peak demand period (S204), operating the appliance in an energy savings during the peak demand period (S206), scheduling, delaying, adjusting and/or selectively deactivating any number of one or more power consuming features/functions of the appliance 100 described above to reduce power consumption of the appliance in the energy savings mode (S208), and returning to the normal mode after the peak demand period is over (S210).

Figure 4:
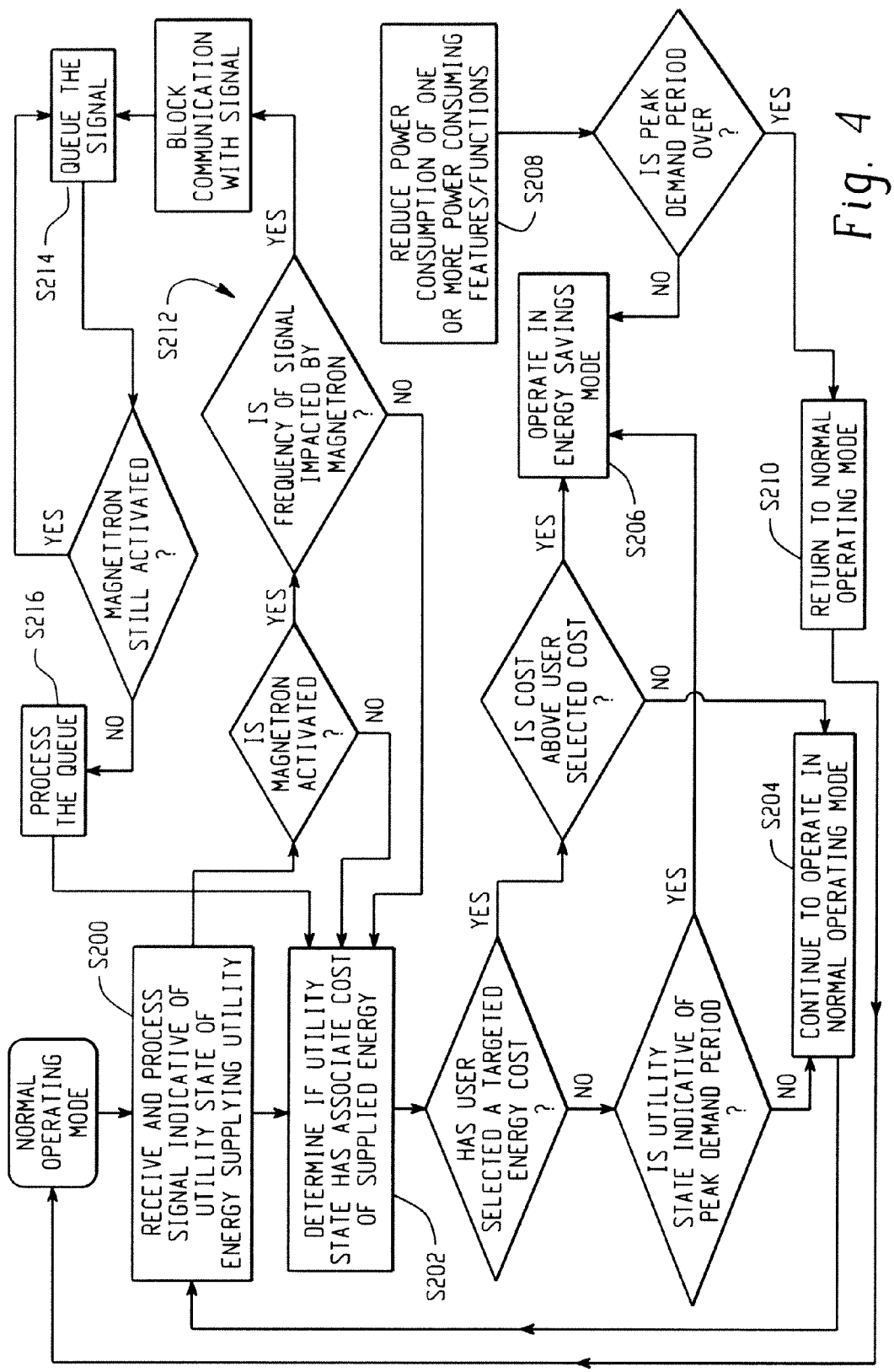

With reference to FIG. 4, if the cooking appliance 100 includes the magnetron 160, the control method can further comprise temporarily blocking the communication with the associated utility during operating of the magnetron 160 if the frequency of the energy signal is impacted by the magnetron to prevent unreliable communications (S212), queuing the communication with the associated utility during operating of the magnetron (S214), and processing the queue after operation of the magnetron for at least partially determining current operating mode for the cooking appliance (S216).

As indicated previously, the control panel or user interface 172 can include a display and control buttons for making various operational selections. The display can be configured to communicate active, real-time feedback to the user on the cost of operating the appliance 100. The costs associated with using the appliance 100 are generally based on the current operating and usage patterns and energy consumption costs, such as the cost per kilowatt hour charged by the corresponding utility. The controller 102 is configured to gather information and data related to current usage patterns and as well as current power costs. This information can be used to determine current energy usage and cost associated with using the appliance 100 in one of the energy savings mode and normal mode. This real-time information (i.e., current usage patterns, current power cost and current energy usage/cost) can be presented to the user via the display.

It is to be appreciated that a manual or selectable override can be provided on the user interface 172 providing a user the ability to select which of the one or more power consuming features/functions are delayed, adjusted and/or disabled by the controller in the energy savings mode. The user can override any adjustments, whether time related or function related, to any of the power consuming functions. Further, the user can override the current operating mode of the appliance 100. Particularly, as shown in FIG. 3, if the utility state has an associated energy cost, the user can base operation of the appliance on a user selected targeted energy cost, such a selected pricing tier or cost per kilowatt hour charged by the corresponding utility (S220). If the current cost exceeds the user selected cost, the controller 102 will operate the appliance 100 in the energy savings mode (S222). If the current cost is less than the user selected cost, the controller 102 will operate the appliance 100 in the normal mode (S222). This operation based on a user selected targeted energy cost is regardless of the current energy cost being indicative of one of a peak demand period and an off-peak demand period.

The operational adjustments, particularly an energy savings operation can be accompanied by a display on the control panel which communicates activation of the energy savings mode. The energy savings mode display can include a display of "ECO", "Eco", "EP", "ER", "CP", "CPP", "DR", or "PP" on the appliance display panel in cases where the display is limited to three characters. In cases with displays having additional characters available, messaging can be enhanced accordingly. Additionally, an audible signal can be provided to alert the user of the appliance operating in the energy savings mode.

The duration of time that the appliance 100 operates in the energy savings mode may be determined by information in the energy signal. For example, the energy signal may inform the appliance 100 to operate in the energy savings mode for a few minutes or for one hour, at which time the appliance returns to normal operation. Alternatively, the energy signal may be continuously transmitted by the utility provider, or other signal generating system, as long as it is determined that instantaneous load reduction is necessary. Once transmission of the signal has ceased, the appliance 100 returns to normal operating mode. In yet another embodiment, an energy signal may be transmitted to the appliance to signal the appliance to operate in the energy savings mode. A normal operation signal may then be later transmitted to the appliance to signal the appliance to return to the normal operating mode.

The operation of the appliance 100 may vary as a function of a characteristic of the utility state and/or supplied energy, e.g., availability and/or price. Because some energy suppliers offer what is known as time-of-day pricing in their tariffs, price points could be tied directly to the tariff structure for the energy supplier. If real time pricing is offered by the energy supplier serving the site, this variance could be utilized to generate savings and reduce chain demand. Another load management program offered by energy supplier utilizes price tiers which the utility manages dynamically to reflect the total cost of energy delivery to its customers. These tiers provide the customer a relative indicator of the price of energy and are usually defined as being LOW, MEDIUM, HIGH and CRITICAL. The controller 102 is configured to operate the appliance in an operating mode corresponding to one of the price tiers. For example, the controller is configured to operate the cooking appliance 100 in the normal operating mode during each of the low and medium price tier and is configured to operate the appliance in the energy savings mode during each of the high and critical price tier. These tiers are shown in the chart of FIG. 7 to partially illustrate operation of the appliance 100 in each pricing tier. In the illustrative embodiment the appliance control response to the LOW and MEDIUM tiers is the same namely the appliance remains in the normal operating mode. Likewise the response to the HIGH and CRITICAL tiers is the same, namely operating the appliance in the energy saving mode. However, it will be appreciated that the controller could be configured to implement a unique operating mode for each tier which provides a desired balance between compromised performance and cost savings/energy savings. If the utility offers more than two rate/cost conditions, different combinations of energy saving control steps may be programmed to provide satisfactory cost savings/performance tradeoff.

In accordance with the present disclosure, an electromechanically controlled cooking appliance that does not have electronic controls is provided, which can operated in an energy saving mode to reduce peak power when deployed in an energy management system of the type illustrated in FIG. 1. The electromechanical controls include one or more infinite switches and a thermostat rather than an electronic control system with an electronic user interface. The infinite switches operate at a duty cycle determined by the user selected setting to control the delivery of power to the surface units and the thermostat switch cycles the oven heater to achieve and maintain the temperature in the oven selected by the user.

Figure 6:
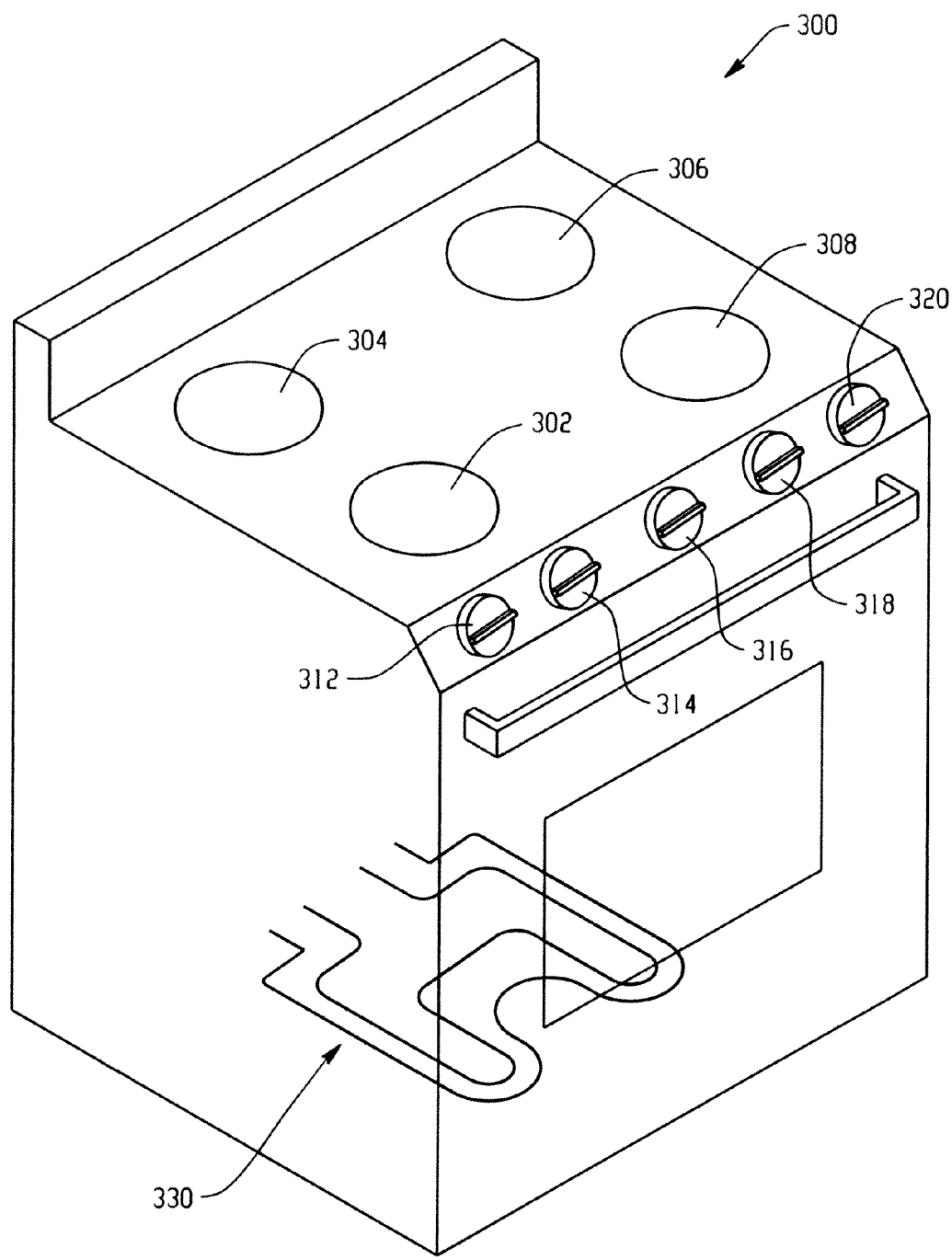
FIG. 6 is an exemplary embodiment of a cooking appliance with electromechanical control adapted for operation in an energy management system of the type illustrated in FIG. 1.

A range 300 illustratively embodying such a control arrangement is schematically illustrated in FIG. 6. Range 300 has four surface heating units 302, 304, 306 and 308, each having an associated infinite heat switch mechanically linked to control knobs 312, 314, 316, and 318 respectively. The user selects the power setting for each surface heating unit, by manually adjusting the control knobs to the desired setting, in conventional fashion. Range 300 further includes an oven cavity with an oven heater 330 disposed proximate the bottom of the oven cavity conventionally provided within the range body for heating the cavity. An electromechanical thermostat switch for controlling energization of the oven heater is mechanically linked to an oven control knob 319. Range 300 further includes a relatively simple electronic control 320 (FIG. 8), which is configured to receive utility state signals from a DSM or directly from a smart utility meter when for example, range 300 is deployed in an energy management system of the type described above with reference to FIG. 1, and to provide control signals for the electromechanical controls to enable operation in an energy savings mode. Range 300 further includes a heater status sensor arrangement configured to monitor the operating state of the surface heating units and oven heater and provide feedback to control 320 indicative of the on/off state of each of the heating units and oven heater to enable control 320 to determine when to terminate operation in the energy saving mode as hereinafter described.

Figure 7A:
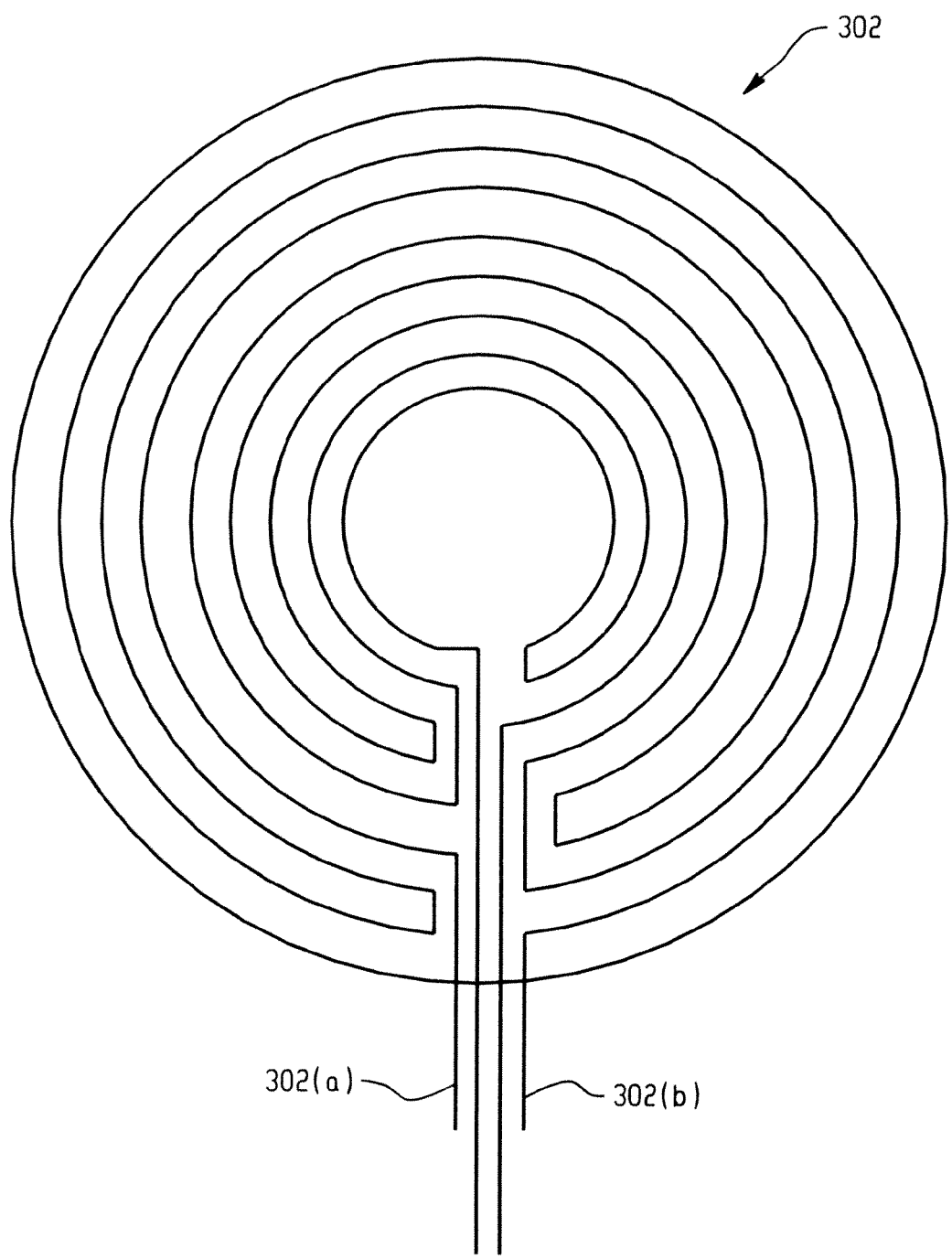
FIGS. 7(a) and (b) illustrate exemplary embodiments of a surface heating unit and oven heater respectively of the cooking appliance of FIG. 6.
Figure 7B:
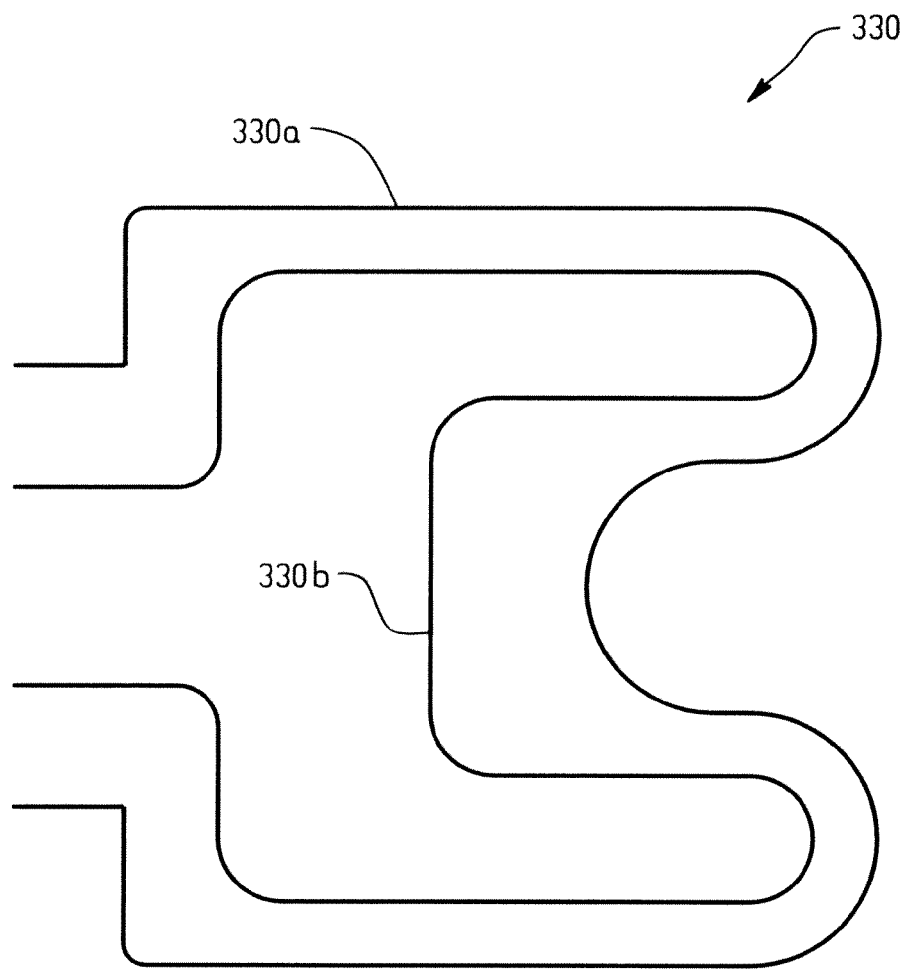

As illustrated in FIGS. 7A and 7B, to facilitate the implementation of an energy savings mode, at least surface heating unit 302 comprises two resistive heating elements 302a and 302b and oven heater 330 comprises heating elements 330a and 330b. The heater elements 302a and 302b are preferably distributed over the heating area of the surface heating unit, such that if only one element is energized, it would not affect the size of pan able to be heated. Alternatively, a concentric arrangement of the elements could be employed however, in such an arrangement, disabling energization of the outermost element would reduce the area generally circumscribed by the energized portion of the surface unit thereby affecting the heating of larger pan sizes.

Figure 8:
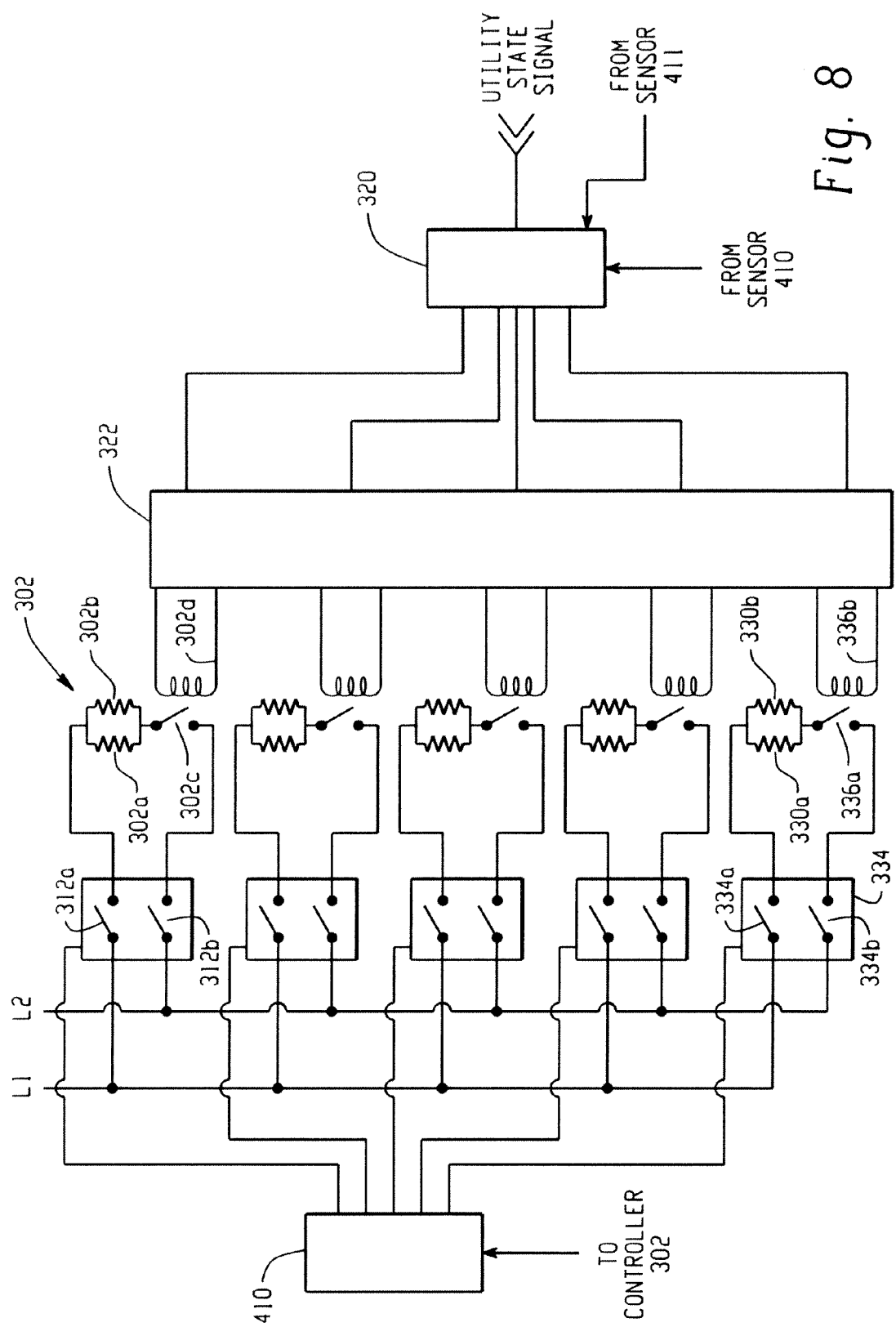
FIG. 8 is a simplified schematic circuit diagram of the power control system for the cooking appliance of FIG. 6.

An illustrative embodiment of the physical configuration of surface heating unit 302 is shown in FIG. 8. Elements 302a and 302b are preferably configured in interleaved fashion such that each element substantially extends beneath the same cooking surface area or zone. By this arrangement of elements, energizing one or the other will not affect the ability to heat larger pan sizes based on the diameter of the effective heating area or zone. Similarly, the oven heater 330 comprises two heating elements 330a and 330b which are preferably distributed over the typical heating area of a conventional bake heater and configured in a planar pattern proximate the lower region of the oven cavity in such a manner that if only one element is energized, it would not substantially adversely affect the heat distribution in the oven.

A simplified schematic circuit diagram of the power circuit for the surface units and oven heater is illustrated in FIG. 8. The first heating element 302a of surface unit 302, which in this embodiment is a 1200 watt resistive element, is connected in parallel with second heating element 302b, an 800 watt resistive element, across a standard 240 volt ac power supply represented by L1 and L2 via a conventional infinite switch mechanically coupled to control knob 312 (FIG. 6). The infinite switch includes on/off switch 312a and cycling switch 312b. Switch 312a is closed and opened by the movement of the control knob 312 from and to its off position respectively. Switch 312b cycles at a rate determined by the position of the control knob to energize the heating elements at the duty cycle selected by the user. To facilitate operation in an energy saving mode, a normally closed relay switch 302c is connected in series with the second heating element 302b to allow selective disabling of element 302b during operation in the energy saving mode. Relay coil 302d, which controls the state of switch 302c, is connected in a conventional relay driver circuit 322 which is electrically coupled to electronic control device 320.

First oven heating element 330a of oven heater 330 which in this embodiment is a 550 watt resistive element, is connected in parallel with second heating element 330b, a 2300 watt resistive element, across a standard 240 volt ac power supply represented by L1 and L2 via a conventional thermostat switch 334 which comprises on/off switch 334a and cycling switch 334b and a temperature sensor, (not shown) positioned in the oven to sense the ambient temperature in the oven cavity. Switch 334a is closed by the movement of oven control knob 312 from its Off position toward its bake temperature selection positions and opened by returning of the knob to its Off position. Alternatively, the on/off switch contacts 334a could be opened and closed by a separate user actuable button or switch control. The user selects the desired bake temperature of the oven by rotation of the control knob 319 to the position associated with the desired temperature in conventional fashion. Switch 334b cycles on when the thermostat senses a temperature in the oven that is less than the setpoint temperature selected by the user and opens when the temperature sensed exceeds the selected setpoint temperature. To facilitate operation in an energy saving mode, a normally closed relay 336 includes normally closed switch contacts 336a connected in series with the second heating element 332b to allow selective disabling of element 332b. Relay coil 336b which controls the state of switch contacts 336a is connected in relay driver circuit 322 which is electrically coupled to electronic control device 320.

During operation in the normal operating mode, relay switches 302c and 336a are closed and the cycling of both surface unit heating elements 302a and 302b are duty cycle controlled by the infinite switch in a conventional manner and the cycling of oven heating elements 330a and 330b are controlled by the thermostat switch 334 in a conventional manner. In response to a utility state signal indicative of a peak demand period, control 320 initiates operation in the energy saving mode, by generating a switching signal which energizes relay coils 302d and 336b causing relay switches 302c and 336a to open disabling energization of surface heating element 302b and oven element 330b respectively. Surface element 302a and oven element 330a will continue to cycle under the control of the infinite switch and thermostat switch respectively. Control 320 will sustain the switching signal for the duration of the peak demand period. On receipt of a utility signal signifying an off-peak demand period, control 320 will de-energize coils 302d and 336b and switches 302c and 336a will return to their normally closed state. By this arrangement when operating in the energy saving mode, disabling of the second surface unit element 302b results in a 40% reduction in energy consumption by the surface unit and disabling of the second oven element 330b results in approximately 20% reduction in peak energy consumption by the oven heater 330 relative to operation in the normal mode.

In range 300 the other three surface heating units are similarly configured and controlled, for maximum energy savings. However, at least some energy saving benefits can be achieved by any combination of one or more such configured and controlled heating units.

In the illustrative embodiment a single pole single throw relay switching device is provided for each heating unit to allow for selectively disabling the second element on some but not necessarily all surface units when in the energy savings mode. However, since power switching is primarily controlled by the infinite heat switches such that the relay switches don't need to switch power to the heating elements, a four pole, single throw relay switching device could be employed which would disable energization of the second element for all the surface units in the energy savings mode. Also, while in the illustrative embodiment electromechanical relay switches are employed, it is to be understood that, solid state switching devices can be similarly employed.

While in the illustrative embodiment an electromechanical relay 336 is employed, it is to be understood that, solid state switching devices can be similarly employed.

While the illustrative embodiment employs an electromechanical thermostat switching device as the user adjustable controller for controlling energization of the oven heater, the arrangement of the subject disclosure could be employed in a cooking appliance with an electronic oven control as the user adjustable controller in similar fashion in order to provide for operation in an energy saving mode without need to make any changes to the oven control algorithms. In such an embodiment, the thermostat switch 334 of FIG. 8 would simply be replaced by an electronically controlled switch responsive to the electronic oven control. The arrangement and operation of control 320 and relay 336 need not differ from that described for the embodiment of FIG. 8. Alternatively, control 320 could be incorporated into the electronic oven control such that the switching signal to relay driver 338 and switching signals for the switch that is substituted for thermostat 334 would be provided by the electronic oven control.

In the event that any of surface heating elements 302, 304, 306 and 308 remains in use at the conclusion of a peak demand period, it may not be desirable or efficient to allow the power output of those surface units that remain in use to be immediately restored to normal after operating at a reduced power output as a result of implementation of the energy saving mode. Therefore, an element status sensor 410 is included for providing feedback to the control 320 indicating the use or on/off state of each of the surface units. The feedback from the element status sensor 410 to the control 320 in the illustrative embodiment is achieved by monitoring the state of the ON/OFF switches for the infinite switches and thermostat. If the switch is in its closed state or position, the corresponding surface heating unit or oven heating element is recognized by control 320 as in use. The state of a hot light indicator, or a, a bi-metal to detect heat, voltage or current detector, or the like could be similarly employed. Based on the feedback from the element status sensor 410, the control 320 determines if the power should return to normal immediately or if at least one of the switches 302c should remain open until the current load use is over. For instance, if surface heating element 302 is in use on power level 4 and the control receives a signal from the utility indicative of a peak demand period, the control will lower the amount of power available to the surface heating unit. In the illustrative embodiment, power is reduced by 40%. In response, a user may be inclined to adjust the knobs to increase the power level setting to compensate for the lowered power availability. If at the conclusion of the peak demand period, the controller immediately returned the power level to normal while the heating element continued to be powered according to the increased power level setting, the surface unit may cause the item cooking to burn, or otherwise cook improperly. Therefore, to avoid impacting a cooking cycle, the element status sensor 410 signals to the control 320 that one or more heating elements 302, 304, 306, 308 is in use and enables the control to determine whether or not to reenergize until the element(s) have been shut off or sufficiently cooled down.

According to one exemplary embodiment, surface heating element 302 is 2,000 watt rated unit. In response to a peak demand signal from the utility, the control 320 initiates an energy saving mode, reducing the operating wattage down to 1200 watts. After the peak demand period passes, rather than jumping immediately back to 2000 watts, the control 320 may decide to postpone returning to the normal mode if the element status sensor indicates a heating element is in use. Postponing such an immediate jump-back eliminates the risk of burning food, starting a flash or grease fire, or other undesirable event.

Additionally, control 320 is further configured to determine whether deactivation or curtailment of a power consuming feature/function should even occur based on the priority of the load and the consumer's usage. For example, if surface heating element 302 is in use at a relatively low power setting, such as a melt or simmer setting, it may be undesirable to reduce the power to the element in response to a peak demand signal because from a cost benefit standpoint the energy savings benefit is outweighed by the adverse impact on cooking performance In the illustrative embodiment, an additional sensor, element status sensor 411, is provided to provide the control 320 with feedback that a surface heating unit is already in use in at a lower power setting. In response to this feedback from the element status sensor 411, the control 320 does not initiate energy saving mode for the surface heating elements.

Element status sensor 411 may be configured to determine the particular power setting selected for the surface unit by detecting the angular rotational position(s) of the selector shaft of the infinite switch or the control knob mounted thereto. However, rather than sensing each particular setting location, it may be sufficient to determine if the setting is less than (or greater than) a particular predetermined threshold setting. The threshold setting could be selected as the setting above which it is desirable to implement the energy saving mode during peak demand periods and below which the energy saving mode is not to be implemented.

Figure 9:
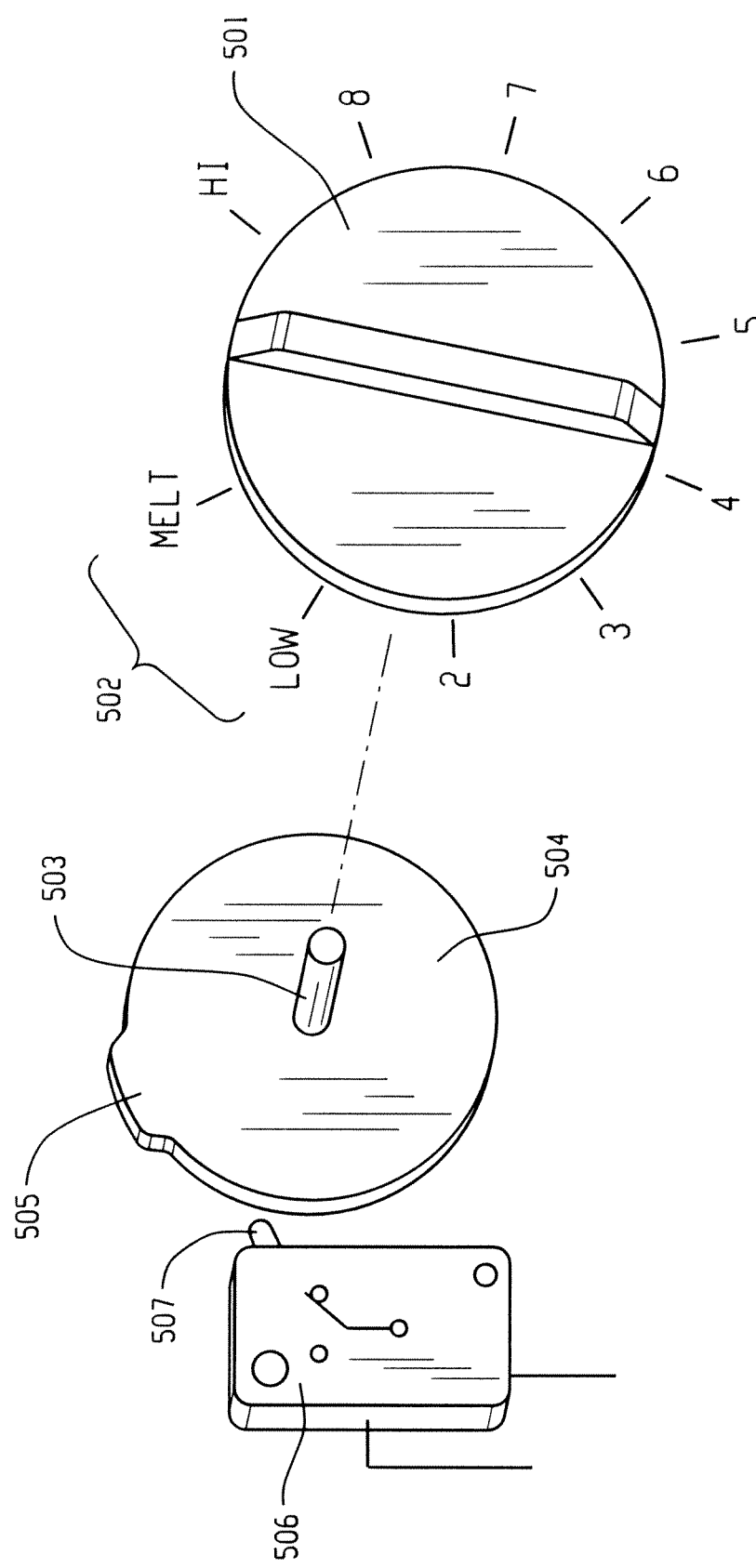
FIG. 9 is an exemplary embodiment of an element status sensor, wherein the sensor is a cam activated switch.

One way in which such a status sensor can be configured to detect if the knob or shaft position has been moved beyond a predetermined angular position, is illustrated in FIG. 9, by placing a cam 504 on the infinite switch or thermostat shaft 503 and an element status sensor in the form of a cam actuated switch 506 in proximity thereto. The cam surface is contoured to include a rotational area 505, which is designed to close the cam actuated switch 506 when the user knob 501 is rotated to or beyond the threshold setting position, which pushes in a plunger 507 located on the switch 506. By this arrangement, when the infinite switch control setting is for a power setting less than the threshold setting 502, the cam 504 would not close the switch 506 and when the control knob is rotated to a setting higher than the threshold, that is rotated beyond the threshold position, the cam would engage and close the cam actuated switch 506. Control 320 monitors the state of the cam actuated switch 506 and initiates the energy savings mode for the surface units when the switch is closed signifying the surface unit is in use at a sufficiently high setting, and does not implement the energy savings mode for the surface unit when the cam actuated switch is open signifying that the surface heating element is in use at a power setting lower than the energy savings mode threshold level.

In the illustrative embodiment, the threshold position is set at slightly above the maximum typical simmer setting. The cam could alternatively be designed to close the switch for settings below the threshold setting and disengage the switch for settings above the threshold setting, in which case the response of the control 320 to the state of the switch would need to be reversed. An alternative configuration includes a rocker switch that could select this feature. The control 320 may then sense the rocker switch, which indicates the use of at least one surface heating unit in use in a reduced power consumption mode.

Figure 10:
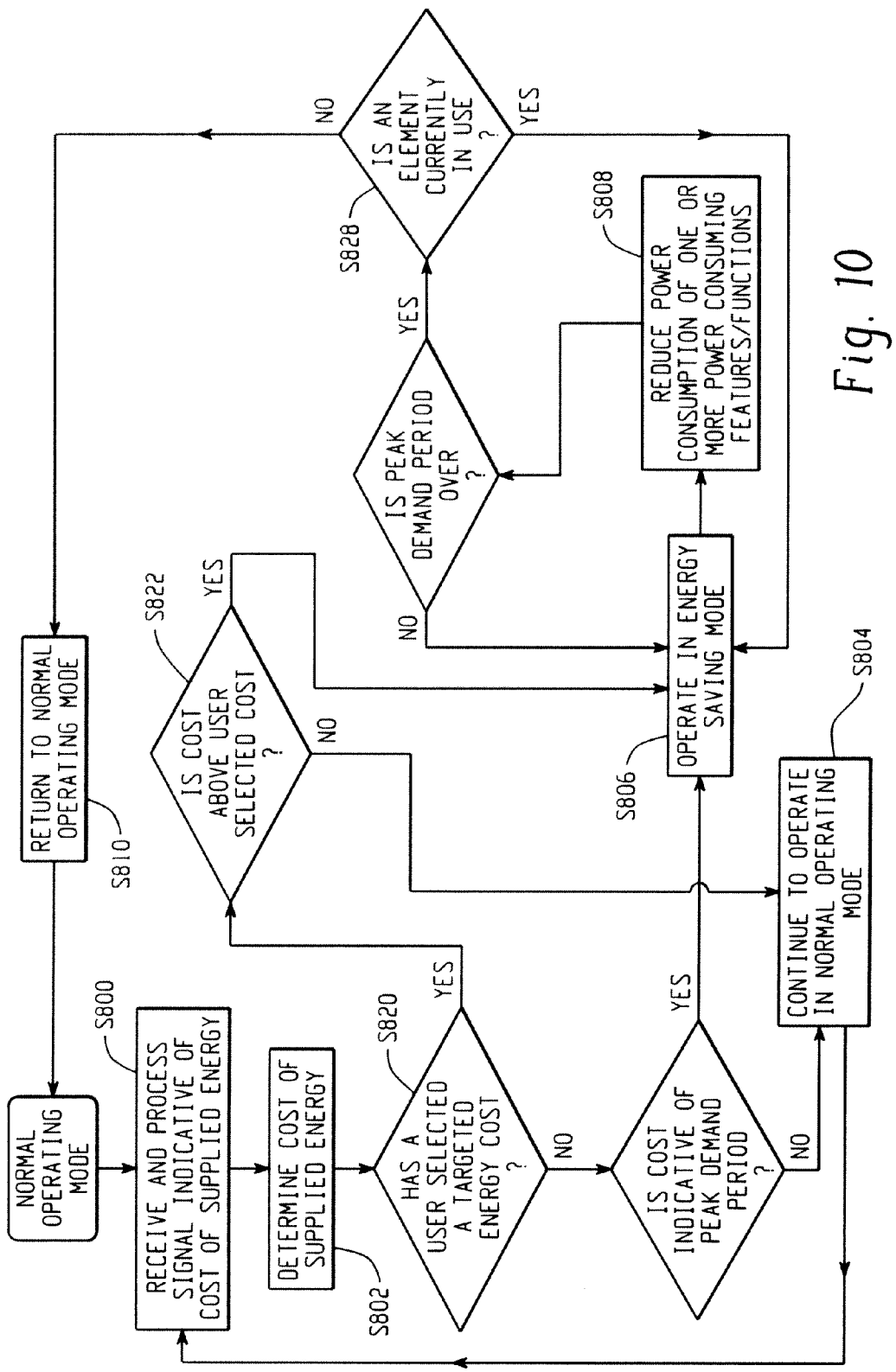
FIG. 10 illustrates an exemplary embodiment of a control method for the cooking appliance of FIG. 6.

With reference to FIG. 10, a control method for an electromechanically controlled cooking appliance according to one embodiment is illustrated. This control method comprises receiving and processing a signal indicative of cost of supplied energy (S800), determining a state for an associated energy supplying utility, such as a cost of supplying energy from the associated utility (S802). The utility state may be indicative of at least a peak demand period or an off-peak demand period. The appliance is then operated in a normal mode during an off-peak demand period (S804) and in an energy savings mode during a peak demand period (S806). Any number of one or more power consuming features/functions of the appliance may be scheduled, delayed, adjusted and/or selectively deactivated to reduce power consumption of the appliance in the energy savings mode (S808). The element status sensor determines whether or not an element is currently in use (S828) and if so, signals to the control to continue to operate in energy savings mode (S806) until the element is no longer in use. Once the element status sensor indicates the element is turned off, the control returns the utility state to normal mode (S810).

Figure 11:
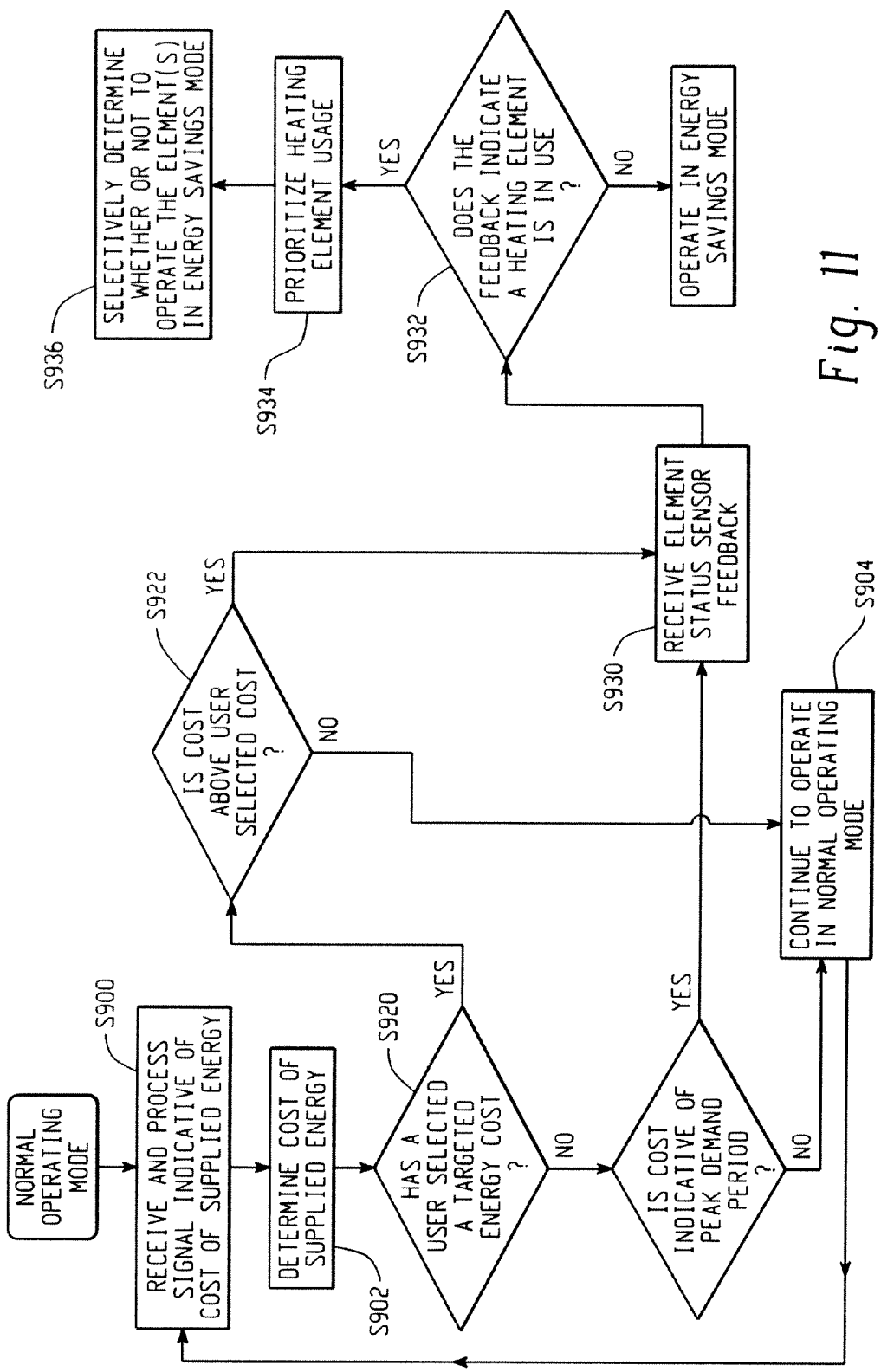
FIG. 11 illustrates another exemplary embodiment of a control method for the cooking appliance of FIG. 6.

The control method further comprises steps to determine if one or more heating elements of an electromechanically controlled cooking appliance should be operated in energy savings mode in the first place, depicted in FIG. 11. As detailed above, the control method comprises receiving and processing a signal indicative of cost of supplied energy (S900), determining a state for an associated energy supplying utility, such as a cost of supplying energy from the associated utility (S902). The utility state may be indicative of at least a peak demand period or an off-peak demand period. The appliance is then operated in a normal mode during an off-peak demand period (S904). The control then receives feedback from the element status sensor (S930) indicative of whether any heating elements are currently in use (S932). If the signal is indicative of a peak demand period and the element status sensor indicates that at least one heating element is currently in use in a reduced power consumption mode, such as simmer, melt, or low heat mode, the control may selectively determine whether or not the power supply to the element(s) can be lowered (S934) to operate the element(s) in energy savings mode (S936). If, however, the feedback from the element status sensor indicates that there are no heating elements in use, the control will automatically begin to operate in energy savings mode It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electromechanically controlled cooking appliance comprising:
    one or more power consuming element including at least one of a surface heating unit for surface cooking and an oven heating unit for heating a cooking cavity;
    at least one of an infinite switch and a thermostat for controlling the energization of a surface heating unit and an oven beating element respectively;
    a control configured to receive and process a signal indicative of the current state of an associated utility including a peak demand state and an off-peak demand state and operate the cooking appliance in one of a plurality of operating modes, including at least a normal operating mode and an energy savings mode, in response to the received signal; at least one of said power consuming elements operating at a lower power level when in the energy saving mode than in the normal operating mode; and
    a first element status sensor adapted to provide feedback to said control indicative of whether a given one of said one or more power consuming elements is in use, wherein at the conclusion of an energy savings mode, said control is configured to use said feedback to determine when to restore said given of said one or more power consuming elements to its normal mode power level;
    wherein upon receiving feedback indicating that said given one of said one or more power consuming elements is in use at the conclusion of a peak demand state period, said control is configured to maintain the enemy savings mode power level for at least said given one of said one or more power consuming elements until feedback indicates that said given one of said one or more power consuming elements is no longer in use.

2. The cooking appliance of claim 1, wherein upon receiving feedback indicating that said one or more power consuming elements is not in use, said control is configured to return the cooking appliance to normal operating mode.

3. The cooking appliance according to claim 1, wherein said first element status sensor is configured to determine whether or not said given one of said one or more power consuming elements is in use by monitoring the state of an ON/OFF switch of at least one of the infinite switch and thermostat.

4. The cooking appliance of claim 1, further including a second element status sensor configured to provide feedback to said control prior to entering energy savings mode if said given one of said one or more power consuming elements is already in use at a lower power setting, wherein said given one of said one or more power consuming elements is a surface heating unit.

5. The cooking appliance of claim 4, wherein said control determines whether to enter energy saving mode based on the feedback from said second element status sensor.

6. The cooking appliance of claim 4, wherein said feedback from at least one of said first and second element status sensor comprises at least one of a hot light indicator, a switch, a bimetal heat detector, and a voltage or current detector.

7. The cooking appliance of claim 4, wherein said second element status sensor is configured to determine a power setting of a surface heating, unit by detecting the angular rotational position of at least one of a selector shaft and control knob of said infinite switch.

8. The cooking, appliance of claim 4, wherein said second element status sensor is configured to determine if a power setting of a surface heating unit is less than a predetermined threshold setting.

9. The cooking appliance of claim 8, wherein the threshold setting is the setting above that which is desirable to implement the energy savings mode, and below that which energy savings mode is not to be implemented.

10. A method for reducing the peak power usage of an electromechanically controlled cooking appliance including, one or more heating elements, including at least one of a surface beating unit for surface cooking and an oven heating unit for heating a cooking cavity, at least one of an infinite switch and a thermostat for controlling the energization of a surface heating unit and an oven heating element respectively, a control configured to receive and process a signal indicative of the current state of an associated utility, the utility state being indicative of one of a peak demand period and an off-peak demand period, and a first element status sensor, the method comprising the steps of:
    receiving and processing by said control a signal indicative of a peak demand period;
    receiving and processing by said control feedback from said first element status sensor indicating whether said one or more heating elements are currently in use;
    selectively entering energy savings mode for said one or more heating elements;
    receiving and processing a signal by said control indicating the conclusion of a peak demand period;
    receiving feedback from said first element status sensor indicating whether a given one of said one or more heating elements remains in use; and
    maintaining energy savings mode for said given said one or more heating elements if said feedback indicates that said given one of said one or more heating elements are in use at the conclusion of a peak demand period.

11. The method according to claim 10, further including returning said appliance to normal mode upon receiving feedback from said first element status sensor indicating that none of said one or more heating elements are in use.

12. The method according, to claim 10, wherein feedback from said first element sensor is achieved by monitoring the state of an ON/OFF switch of said at least one of said infinite switch and thermostat.

13. The method according to claim 10, further including providing a second element status sensor configured to provide feedback to said control prior to entering energy savings mode indicating whether said given one of said one or more heating elements is already in use at a lowered power level.

14. The method according to claim 13, wherein the lowered power level includes one of simmer, melt, and low heat.

15. The method according to claim 13, wherein the feedback from the second element status sensor to said control is achieved by detecting an angular rotational position of a selector shaft and a control knob mounted on said at least one infinite switch.

16. The method according to claim 13, wherein the feedback from the second status sensor to said control is achieved by determining if power level is less than a predetermined threshold setting.

17. A system for reducing the peak power consumption of an electromechanically controlled cooking appliance comprising at least one power consuming element, said system comprising:
   at least one of an infinite switch and a thermostat configured to control the delivery of power to at least one power consuming element;
   a control configured to receive and process a signal indicative of the current state of an associated utility, said state being indicative of one of a peak demand period and an off-peak demand period, the control adapted to operate the cooking appliance in one of a normal operating mode and an enemy saving mode, in response to the received signal;
   a first element status sensor configured to provide feedback to said control indicative of whether a given one of said one or more power consuming elements is in use;
   a second element status sensor configured to provide feedback to said control indicative of whether to predetermined threshold setting has been achieved, wherein upon receiving, a signal indicative of a peak demand period, said control is configured to determine whether to operate in energy savings mode based on said feedback from said second element status sensor, and whether to return to normal operating mode based on feedback from said first element status sensor
   wherein upon receiving feedback indicating that said given one of said one or more power consuming elements is in use at the conclusion of a peak demand state period, said control is configured to maintain the energy savings mode power level for at least said given one of said one or more power consuming elements until feedback indicates that said given one of said one or more power consuming elements is no longer in use.

18. The system according to claim 17, wherein the feedback from said second element status sensor is indicative of whether said given one of said one or more power consuming elements is already in use in a reduced power consumption mode.

19. The system according to claim 17, wherein the feedback from said first element status sensor is indicative of the ON/OFF state of said one or more power consuming elements.

20. The cooking appliance of claim 1, wherein the feedback from said first element status sensor is further indicative of an amount of power being consumed by said given one of said one or more power consuming elements.

* * * * *

UNITED STATES PATENT AND TRADEMARK OFFICE
CERTIFICATE OF CORRECTION

| | |
|---|---|
| PATENT NO. | : 8,843,242 B2 |
| APPLICATION NO. | : 12/948135 |
| DATED | : September 23, 2014 |
| INVENTOR(S) | : Burt |

It is certified that error appears in the above-identified patent and that said Letters Patent is hereby corrected as shown below:

In the Specification

In Column 3, Line 59, delete "interne" and insert -- internet --, therefor.

In Column 6, Lines 31-32, delete "element" and insert -- elements --, therefor.

In Column 7, Line 53, delete "element" and insert -- elements --, therefor.

In Column 7, Line 63, delete "element" and insert -- elements --, therefor.

In Column 13, Line 16, delete "If at" and insert -- If, at --, therefor.

In the Claims

In Column 15, Line 28, in Claim 1, delete "beating" and insert -- heating --, therefor.

In Column 15, Line 49, in Claim 1, delete "enemy" and insert -- energy --, therefor.

In Column 16, Line 10, in Claim 6, delete "bimetal" and insert -- bi-metal --, therefor.

In Column 16, Line 14, in Claim 7, delete "heating," and insert -- heating --, therefor.

In Column 16, Line 17, in Claim 8, delete "cooking," and insert -- cooking --, therefor.

In Column 16, Line 26, in Claim 10, delete "including," and insert -- including --, therefor.

In Column 16, Line 28, in Claim 10, delete "beating" and insert -- heating --, therefor.

Signed and Sealed this
Fifth Day of May, 2015

Michelle K. Lee
*Director of the United States Patent and Trademark Office*

CERTIFICATE OF CORRECTION (continued)
U.S. Pat. No. 8,843,242 B2

In Column 16, Line 49, in Claim 10, delete "for said given said" and insert -- for at least said given one said --, therefor.

In Column 16, Line 57, in Claim 12, delete "according," and insert -- according --, therefor.

In Column 17, Line 22, in Claim 17, delete "enemy" and insert -- energy --, therefor.

In Column 17, Line 28, in Claim 17, delete "whether to" and insert -- whether a --, therefor.

In Column 18, Line 1, in Claim 17, delete "receiving," and insert -- receiving --, therefor.

In Column 18, Line 6, in Claim 17, delete "sensor" and insert -- sensor, --, therefor.